US007679781B2

(12) United States Patent
Shibuya et al.

(10) Patent No.: US 7,679,781 B2
(45) Date of Patent: Mar. 16, 2010

(54) COLOR IMAGE PROCESSING APPARATUS AND COLOR PRINTER SYSTEM

(75) Inventors: Takeshi Shibuya, Ibaraki (JP); Naoyuki Urata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1053 days.

(21) Appl. No.: 11/362,900

(22) Filed: Feb. 28, 2006

(65) Prior Publication Data

US 2006/0197998 A1 Sep. 7, 2006

(30) Foreign Application Priority Data

Mar. 1, 2005 (JP) .......................... P2005-055326
Nov. 25, 2005 (JP) .......................... P2005-339550

(51) Int. Cl.
*G03F 3/08* (2006.01)
(52) U.S. Cl. .......................... 358/1.9; 358/518; 358/521
(58) Field of Classification Search .................. 358/1.1, 358/1.9, 500, 501, 518, 521, 530
See application file for complete search history.

(56) References Cited

U.S. PATENT DOCUMENTS

| | | | | |
|---|---|---|---|---|
| 5,113,248 A | * | 5/1992 | Hibi et al. ................... | 358/501 |
| 5,732,153 A | * | 3/1998 | Ohsawa ...................... | 382/191 |
| 6,088,477 A | * | 7/2000 | Ohta et al. .................. | 382/167 |
| 7,460,269 B2 | * | 12/2008 | Sato ........................... | 358/1.9 |

FOREIGN PATENT DOCUMENTS

| | | |
|---|---|---|
| JP | 5-328131 | 12/1993 |
| JP | 10-39555 | 2/1998 |
| JP | 2000-25274 | 1/2000 |
| JP | 2000-343761 | 12/2000 |
| JP | 2001-255711 | 9/2001 |
| JP | 2003-125225 | 4/2003 |
| JP | 2003-312061 | 11/2003 |
| JP | 2005-33348 | 2/2005 |

OTHER PUBLICATIONS

PostScript Language Reference third edition; Adobe Systems Incorporated; Addison-Wesley Publishing Company; pp. 475-477, 897.

* cited by examiner

*Primary Examiner*—Thomas D Lee
(74) *Attorney, Agent, or Firm*—McGinn IP Law Group, PLLC

(57) ABSTRACT

A color image processing apparatus includes: a minimum value selection unit that selects a minimum value of an input gray level values; a first calculation unit that calculates a generation amount of black; a second calculation unit that calculates an UCR amount which is a value relevant to the minimum value; a third calculation unit that outputs a correction coefficient value which is a value relevant to the minimum value; a subtraction unit that subtracts the UCR amount from each of the input gray level values to generate output; a multiplication unit that multiply the output of the subtraction unit by the correction coefficient value; a significant bit selection unit that selects a significant bit of a multiplication result; and a gray level correction unit that makes a gray level correction to the generation amount of black and the output of the multiplication unit.

12 Claims, 11 Drawing Sheets

COLOR IMAGE PROCESSING APPARATUS AND COLOR PRINTER SYSTEM

BACKGROUND OF THE INVENTION

1. Field of the Invention

This invention relates to a color image processing apparatus and a color printer system and in particular to a color image processing apparatus and a color printer system for generating image signals of four colors of cyan (C), magenta (M), yellow (Y), and black (K) from red (R), green (G), and blue (B) image signals.

2. Description of the Related Art

Although the basic primary colors in color print are three colors of cyan (C), magenta (M), and yellow (Y), a printer with four colors of C, M, Y and black (K) as the basic primary colors is often used from the viewpoint of the quality of frequently used black font, the print cost, or the advantage in a clear natural image.

On the other hand, input image data of a business printer, etc., used in an office generally is provided by three-color data of red (R), green (G), and blue (B) and therefore four-color separation of a process of generating CMYK data from RGB data is required.

Usually the four-color separation is implemented as processing of calculating the complement of RGB data (r, g, b), generating CMY data (c, m, y), and partially replacing CMY common element min $\{c, m, y\}$ with K component data (k) where min $\{c, m, y\}$ is the minimum value of the CMY data (c, m, y), as disclosed on page 476 of "PostScript Language Reference third edition" (Adobe Systems Incorporated, February 1999).

The K component generated by performing the processing as described above is called BG (Black Generation) and the CMY component removed as the CMY data is replaced with K is called UCR (Under Color Removal).

The effect of decreasing the maximum color material amount per unit print area is shown as one of the large merits of such BG processing and UCR processing. In the Specification, the maximum color material amount per unit print area will be hereinafter called simply the maximum color material amount or if the printer is a laser printer, the maximum toner amount.

For example, a method called 100% UCR is available as a method capable of most decreasing the maximum color material amount. This is a method of subtracting k found as k=min $\{c, m, y\}$ from CMY data (c, m, y) to obtain CMY data (c', m', y') after undergoing the UCR processing as in expression (1):

$$\left.\begin{aligned} c' &= c - k \\ m' &= m - k \\ y' &= y - k \end{aligned}\right\} \quad (1)$$

The maximum color material amount of four-color print of CMYK in the 100% UCR becomes 200% of the maximum color material amount per color. Since the maximum color material amount to print in four colors of CMYK without performing UCR processing is 400%, it is seen that the maximum color material amount can be adjusted in the range of 200% to 400% by performing BG processing and UCR processing.

On the other hand, generally as for printers for printing in multiple colors, it is known that the more excessive the maximum color material amount, the larger the apparatus load, resulting in a tendency toward the instability of reproducibility of overlaid colors.

For example, in a laser printer, as the toner layer is thicker, the transfer performance becomes more easily unstable and in an ink jet printer, as the ink amount is larger, ink bleeding to paper becomes easier to occur. In a laser printer for fusing toner, if an attempt is made to cover the maximum toner amount, the heat energy to be input in a unit time becomes large and thus problems of upsizing of a fuser and shortening of the fuser life are introduced.

Thus, to develop a printer engine, requirement for cutting down the maximum color material amount as long as the image quality is allowed occurs. However, from the viewpoint of the image quality, if extreme UCR processing like 100% UCR is performed, an extremely hard and dark image low in saturation on the whole is produced and the contrast is degraded because the color material amount is small.

From the contrary demands, the value to provide the best balance between the engine performance and the image quality is selected for design in the range of about 300% to 350% per color for commercial print or in the range of about 200% to 300% in a popularly priced laser printer, etc., for limitation of the maximum color material amount.

On the other hand, an art of attaching a density sensor to a printer and making gray level correction using a detection signal from the sensor, thereby controlling the color material amount is also already known.

For example, JP-A-10-39555 discloses an art of optimizing a look-up table (LUT) to convert the density data for each gray level into an output signal by performing first gray level control and controlling the toner replenishment amount for stabilizing the image density by performing second gray level control to keep the gray level characteristic constant against environment fluctuation. However, this example concerns stabilization of the single-color gray level characteristic and does not provide means for circumventing image instability caused by excess of the total toner amount in color print as described above.

JP-A-5-328131 discloses an art of managing the toner deposition amount for adjusting the density constant so that the density of the whole output image does not change if the user adjusts the gray level characteristic.

Further, JP-A-2001-255711 proposes an art of calculating the toner deposition amount of an image based on the gray level data subjected to gray level correction and measurement data of a temperature-humidity sensor and alerting the user by notification means if the calculation result is equal to or greater than the upper limit value of the toner deposition amount determined by the fixing performance of a fuser.

The arts in JP-A-5-328131 and JP-A-2001-255711 assume that hardware feedback is executed in response to user's adjustment. Thus, in a printer shared among computers, a sequence for feedback occurs each time a print request is made, resulting in extra load on the apparatus and an increase in the operation cost.

JP-A-2003-312061 discloses a method of directly limiting the sum total of color components using a multi-dimensional LUT. In such a method, however, if the number of lattice points is five in a LUT corresponding to four-dimensional input/output of CMYK, as many as $5^4 \times 4 = 2500$ pieces of data are required.

Use of such a large-scaled multi-dimensional LUT leads to an increase in cost because a large memory space is consumed when the LUT is installed in hardware. If an LUT needs to be again set from the beginning, for example, as the image processing mode is switched between print pages, etc., the time required for transferring the LUT data increases and thus an obstacle to speeding up is presented. A similar problem also occurs in JP-A-2000-25274 and JP-A-2000-343761 because a multi-dimensional LUT is used.

To use a multi-dimensional LUT, calculation (or signal processing) load of interpolation calculation also occurs. For example, if interpolation calculation of comparatively simple multiple linear interpolation is performed for finding, when the interpolation value is calculated from the vertices of eight peripheral grids as in FIG. 3 in JP-A-2000-343761, as many multiplications as (number of input channels)×(number of vertices)×(number of output channels) become necessary.

In this case, the number of input channels is four for CMYK, the number of vertices is eight (interpolation using eight peripheral vertices in black point 11 in FIG. 3 in JP-A-2000-343761), and the number of output channels is four (CMYK) and therefore the necessary number of multiplications becomes 128. Thus, in hardware implementation, the logic scale grows and in software implementation, the computation amount becomes an obstacle to speeding up.

JP-A-2003-125225 discloses a method of feeding back so that the total amount becomes a preset value or less for each input of each color signal. In this method, iteration of processing caused by feeding back occurs for each pixel and thus the method is disadvantageous to speeding up of real-time image processing. In contrast, the saturation and contrast of an image would be able to be improved by performing processing of increasing the total amount in the range in which the total amount does not exceed the preset value, but the method in JP-A-2003-125225 cannot be applied to the processing of increasing the total amount.

JP-A-2005-33348 discloses a method of increasing the toner total amount within the range of a preset value for improving the image quality under a special condition to perform 100% UCR in gray in such a meaning. Such processing has the advantage that the gray balance does not change if subtle balance change occurs in the gray level characteristic of C, M and Y.

In JP-A-2005-33348, however, as seen in FIG. 7, correction coefficient f (k) is used in the range of f (k)>1 and thus if it is also used for limiting the toner total amount in usual four-color separation to mainly use the range of f (k)<1, the f (k) range and resolution and memory and circuit scale saving become difficult to be compatible.

In JP-A-2005-33348, for gray scale correction (γ correction) provided at the later stage of four-color separation as seen in FIG. 1, if it is released to the user directly as a density (or brightness) adjustment parameter, it becomes necessary to provide change caused by user adjustment as a margin in addition to the fluctuation of the engine for the limitation value of the toner total amount. Thus, only the color material less the margin than the essential capability of the printer engine can be used and the color reproduction range is narrowed.

SUMMARY OF THE INVENTION

The present invention has been made in view of above circumstances and provides a color image processing apparatus and color printer system. According to an embodiment of the invention, the color printer system for printing with mixed CMYK color materials realizes total amount control to limit the total color material amount of CMYK color mixing to a preset value or less or an image processing apparatus used with the color printer system, etc. According to an embodiment of the invention, there is provided a color printer system and an image processing apparatus (1) not requiring feedback of the output signal value for each pixel, (2) saving the memory consumption amount and the computation amount, thereby decreasing the hardware installation cost, the computation processing time, and the data transfer time, and (3) also making possible color material amount increasing processing in the regulation range of the total color material amount; particularly realizing processing wherein under color addition to prevent saturation degradation in processing involving a large under color removal amount as in the case where 100% UCR is executed in gray and the toner total amount control in usual four-color separation can be compatible with each other in a small memory amount and computation amount and (4) furthermore preferably, not requiring feedback from user adjustment either.

According to an aspect of the present invention, there is provided a color image processing apparatus that generates output gray level values (c4, m4, y4, k4) of four colors including black from input gray level values (c1, m1, y1) of three colors of cyan, magenta and yellow. The color image processing apparatus includes a minimum value selection unit that selects a minimum value k0 of the input gray level values (c1, m1, y1); a first calculation unit that calculates a generation amount k3 of black based on the minimum value k0; a second calculation unit that calculates an under color removal amount u (k0) which is a value relevant to the minimum value k0; a third calculation unit that outputs a correction coefficient value f (k0) which is a value relevant to the minimum value k0; a subtraction unit that subtracts the under color removal amount u (k0) from each of the input gray level values (c1, m1, y1) to generate output (c2, m2, y2); a multiplication unit that multiply the output of the subtraction unit (c2, m2, y2) by the correction coefficient value f (k0) to obtain output (c3, m3, y3); a significant bit selection unit that selects a significant bit of a multiplication result of the multiplication unit; and a gray level correction unit that makes a gray level correction to the generation amount k3 of black and the output of the multiplication unit (c3, m3, y3) to obtain the output gray level values (c4, m4, y4, k4).

According to another aspect of the invention, there is provided the color image processing apparatus wherein an input/output relationship of at least one of the first, second and third calculation units, and an operation of the significant bit selection unit switches in conjunction with each other.

According to still another aspect of the invention, there is provided the color image processing apparatus wherein the third calculation unit includes an LUT and interpolation computation unit.

According to a further aspect of the invention, there is provided the color image processing apparatus wherein a range of an input value k0 of the third calculation unit is 8 bits, a range of an output value f (k0) of the third calculation unit is 10 bits or more, and a range of an output of the significant bit selection unit as an input to the gray level correction unit is 8 bits.

According to a still further aspect of the invention, there is provided a color image processing apparatus for generating output gray level values (c4, m4, y4, k4) of four colors including black from input gray level values (c, m, y) of three colors of cyan, magenta and yellow, the color image processing apparatus comprising: a first gray level correction unit that makes a gray level correction to the input gray level values (c, m, y); a color correction unit that makes a color correction to output values of the first gray level correction unit (c0, m0, y0) to obtain output (c1, m1, y1); a minimum value selection unit that selects a minimum value k0 of the output (c1, m1, y1); a first calculation unit that calculates a generation amount k3 of black based on the minimum value k0; a second calculation unit that calculates an under color removal amount u (k0) which is a value relevant to the minimum value k0; a third calculation unit that outputs a correction coefficient value f (k0) which is a value relevant to the minimum value k0; a subtraction unit that subtracts the under color removal amount u (k0) from the output (c1, m1, y1) to generate output (c2, m2, y2); a multiplication unit that multiplies the output of the subtraction unit (c2, m2, y2) by the correction coefficient value f (k0); a significant bit selection unit that selects a significant bit of a multiplication result of the multiplication unit; a second gray level correction unit that makes a gray level correction to the generation amount k3 of black and an output of the multiplication unit (c3, m3, y3) to obtain output gray level values (c4, m4, y4, k4); and a user interface that allows a user to enter density gray level adjustment parameters of cyan, magenta, yellow, and black; wherein an input/output relationship of the first gray level correction unit switches in accordance with the gray level adjustment parameters of cyan, magenta, yellow; and wherein an input/output relationship of the first calculation unit switches in accordance with the gray level adjustment parameter of black.

According to embodiments of the invention, a system (a color printer system including a host computer (PC) for editing and creating an image and a printer of an image record section) can be implemented as a method of installing the whole of the image processing section as software in the PC, a method of installing the whole of the image processing section in a controller of the printer, or a method of installing some components including the user interface and the first gray level correction unit of the image processing section as software in the PC (driver section). In this case, the user interface is provided for directly prompting the user to make CMYK density adjustment, for adjusting the brightness of RGB (equivalent to adjusting of the density of CMY of complement of RGB), or for adjusting the brightness signal corresponding to the RGB value (arithmetically converting the brightness signal into adjustment of RGB signal). The density adjustment parameter concerning K is added to image data from the driver section in the PC and is sent to the image processing section in the printer (control section) as required.

Other aspects of the invention will be more clearly understood by the following description.

According to embodiments of the invention, the total amount control of the color materials is realized by multiplying the output of the subtraction unit (c2, m2, y2) by the correction coefficient f (k0). At this time, the correction coefficient f (k0) is determined depending only on k0 of the minimum value of the CMY input value (c1, m1, y1), so that the separation result into CMYK (c4, m4, y4, k4) and the feedback from the printer engine is not required, the logic scale is also saved, and the processing is easily speeded up.

Since the correction coefficient f (k0) can also be defined independently of user's density adjustment, so that in the printer system shared among computers, a sequence for feedback each time a print request is made does not occur, and extra load on the apparatus and an increase in the operation cost are prevented.

Since the correction coefficient f (k0) is defined as a function concerning the minimum value k0 of the CMY input value (c1, m1, y1) or a one-dimensional LUT, it is made possible to implement the correction coefficient f (k0) in a small memory consumption amount as compared with the total amount control system using a multidimensional LUT.

Further, f (k0) is implemented as a one-dimensional LUT for the representative value of k0 and its implementation computation unit, so that the memory consumption amount of the LUT can be still more saved and in addition, to rewrite the LUT, the data write time is shortened and higher-speed processing can be covered.

In the invention, the selection unit that selects a significant bit out of the multiplication result of the multiplication unit can be switched, whereby it is made possible to switch the range in which the correction coefficient f (k0) acts on the subtraction unit output value (c2, m2, y2) between the range of f (k0)≦1 as main and the range of f (k0)>1 as main. Accordingly, both acting ranges can be covered in a narrow input range as the second gray level correction unit.

Accordingly, the toner total amount control in usual four-color separation and under color addition to prevent saturation degradation in processing involving a large under color removal amount as in the case where 100% UCR is executed in gray within the range of the total amount control can be switched in a small memory amount and computation amount.

Particularly, output of the significant bit selection means is 8 bits, whereby it is made possible to share the general gray level correction unit of the image processing unit as the second gray level correction unit, and the apparatus development burden can be lightened.

BRIEF DESCRIPTION OF THE DRAWINGS

Embodiments of the present invention will be described in detail based on the following figures, wherein.

DETAILED DESCRIPTION OF THE INVENTION

Referring now to the accompanying drawings, there are shown preferred embodiments of the invention.

Figure 1:
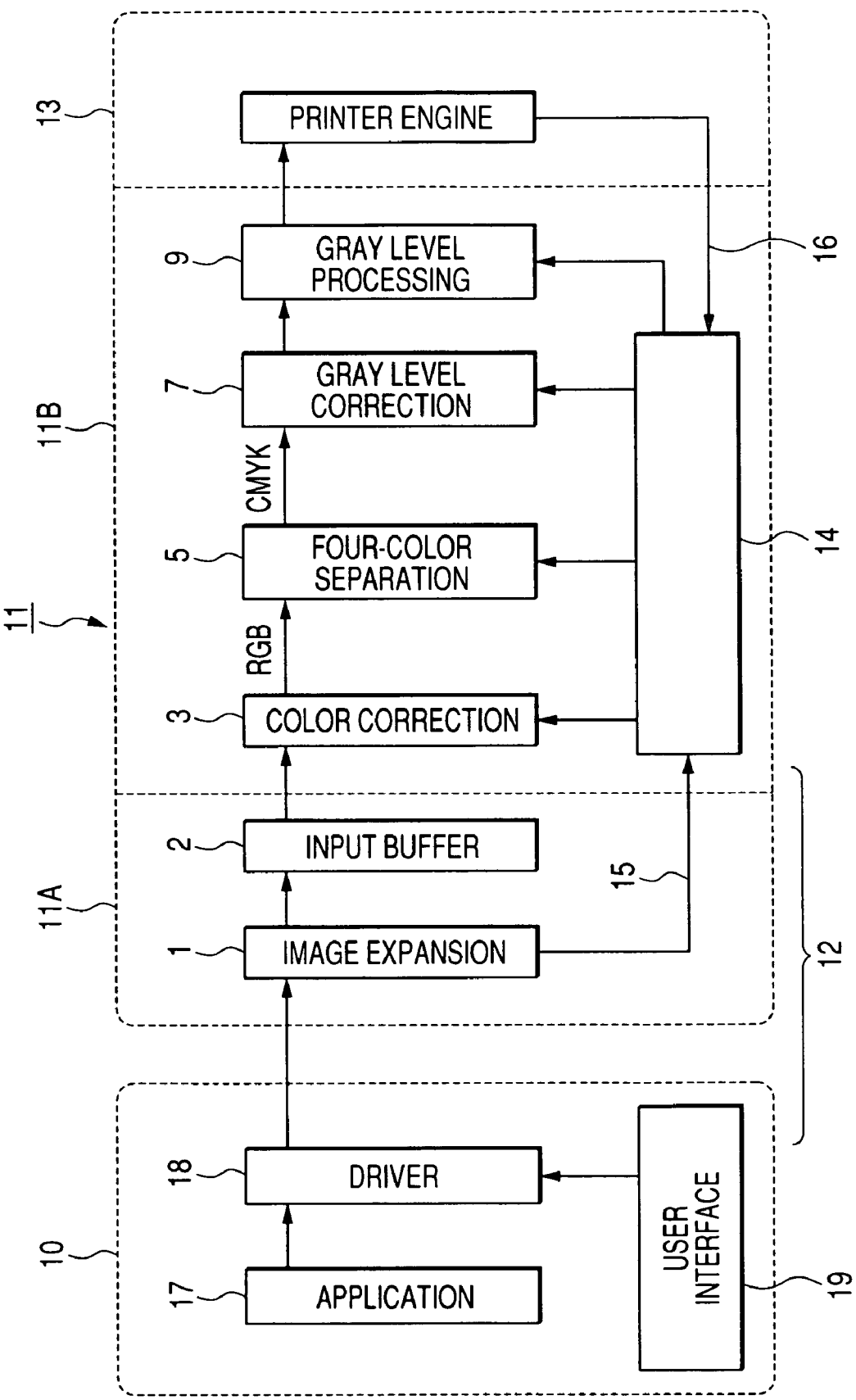
FIG. 1 is a general schematic configuration drawing to show a color laser printer system according to an embodiment of the invention.

FIG. 1 shows the general configuration of a color laser printer system according to the invention. The color laser printer system is mainly made up of a computer 10, a color image processing apparatus 11, and a record section (printer engine) 13. An image processing section 12 of the system is made up of a driver processing section 18 and a user interface 19 implemented as software in the computer 10 and the color image processing apparatus 11 installed as hardware in a controller of the printer. The color image processing apparatus 11 is made up of an image input section 11A and a color image processing section 11B. The embodiments are characterized by the image processing section 12. The configurations and functions of the sections will be discussed in order.

1. Computer 10

The computer 10 in the color laser printer system is, for example, a personal computer (PC) to which information for giving a density adjustment command to each color of CMYK is input through the user interface 19.

A print instruction given to the color image processing apparatus 11 is executed through the printer driver 18 from an application of the PC 10. At this time, the image data to be printed is compressed and is transferred to the color image processing apparatus 11 together with additional information 15 containing a user command input through the user interface 19.

Figure 8:
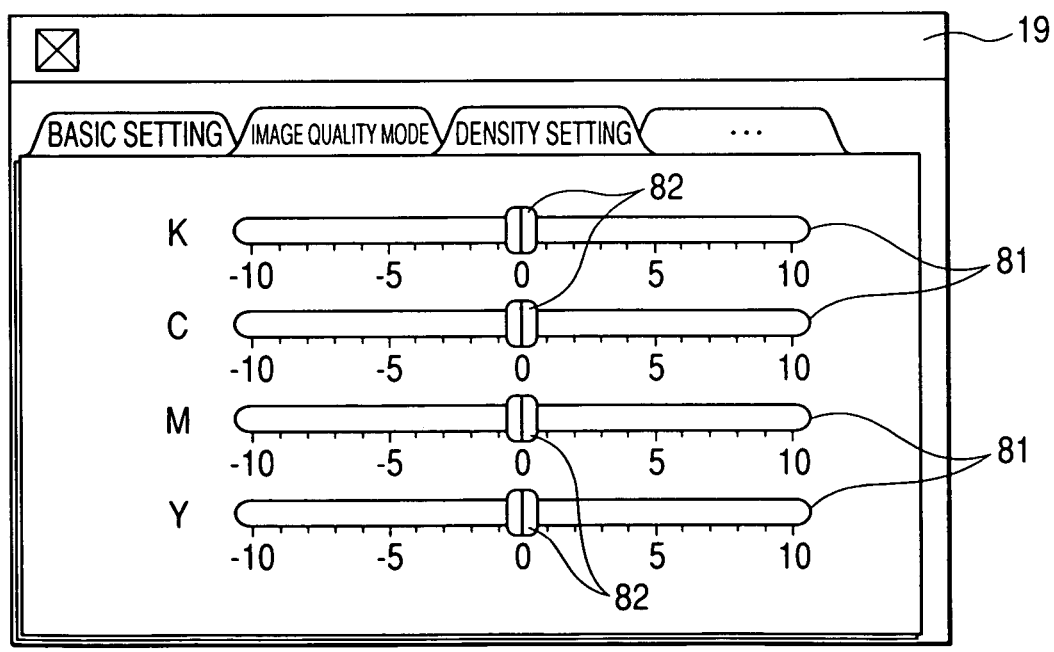
FIG. 8 is a schematic representation of a density adjustment user interface according to an embodiment of the invention.

FIG. 8 shows an example of the density adjustment user interface 19 provided in the PC 10. The user interface 19 is provided with density adjustment sliders 81 in a one-to-one correspondence with C, M, Y, and K, enabling the user to specify a density adjustment parameter in any of 21 steps in the range of −10 to +10 at the position of a marker 82 of each slider. The printer driver 18 adds the density adjustment parameter values of C, M, Y, and K to the additional information 15 and transmits the additional information 15 to the image processing apparatus 11 together with image data.

2. Input Section 11A

The input section 11A of the color image processing apparatus 11 has an image expansion unit 1 and an input buffer 2. The image expansion unit 1 expands the image information sent from the driver 18 in the input buffer 2 and also sends the additional information 15 attached to the image information to a parameter management unit 14. The image data expanded by the image expansion unit 1 is stored in the input buffer 2 as one-page RGB data.

The image data stored in the input buffer 2 is read in succession and is sent to the color image processing section 11B and is subjected to processing of color correction, gray level correction, etc., and then is sent to the record section 13.

3. Record Section 13

Next, an outline of the record section 13 will be discussed.

Figure 7:
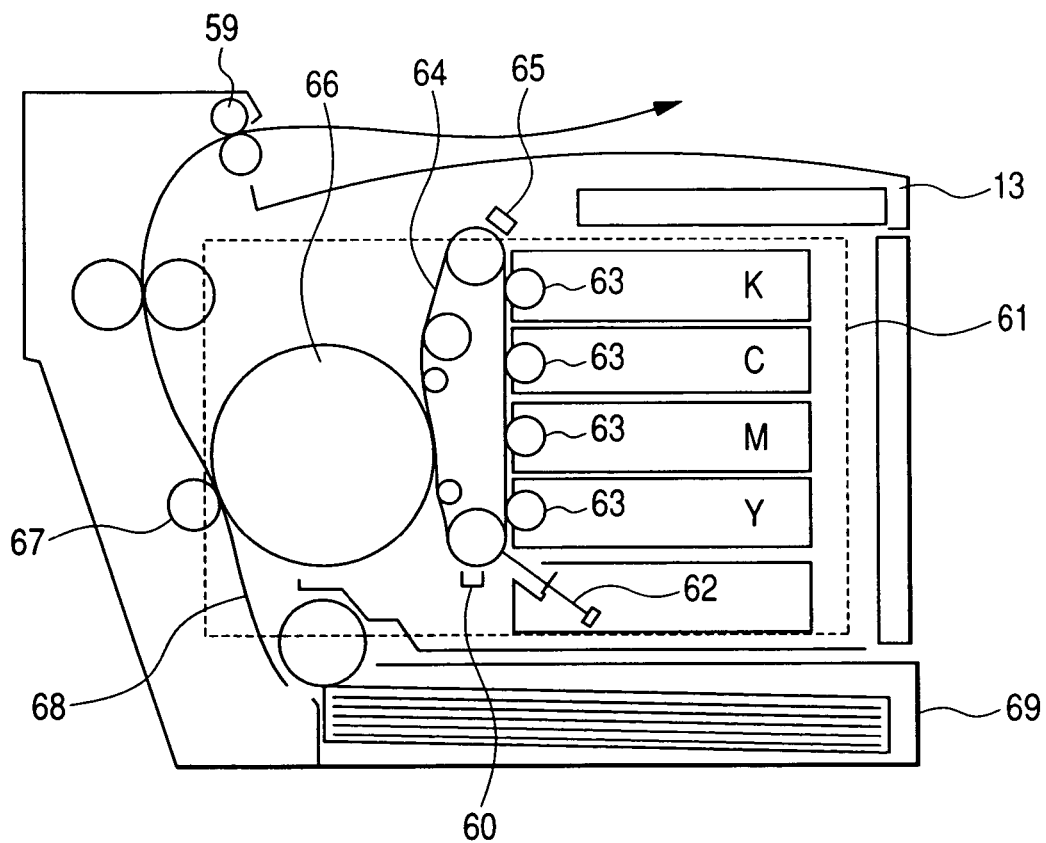
FIG. 7 is a schematic configuration drawing to show a record section according to a first embodiment of the invention.

FIG. 7 is a schematic configuration drawing to show an embodiment of the record section 13. The record section 13 adopts an intermediate transfer body system of using a photoconductor 64 and an intermediate transfer body 66, transferring different four-color toner images formed one color at a time in order on the photoconductor 64 one color at a time every revolution of the intermediate transfer body 66, and forming one color image with four revolutions of the intermediate transfer body 66. In FIG. 7, the photoconductor 64 shaped like a belt is placed in the center of the record section 13 and the intermediate transfer body 66 is placed on one face of the photoconductor 64 in contact with the photoconductor belt 64. Four developing machines for storing different color toners, namely, a yellow (Y) developing machine 63Y, a magenta (M) developing machine 63M, a cyan (C) developing machine 63C, and a black (K) developing machine 63K are placed in a longitudinal stack manner on an opposite face of the photoconductor belt 64 stretching longitudinally long to the intermediate transfer body 66.

The photoconductor belt 64 is surrounded by a charger 60, an exposure unit 62, the developing machines 63, etc., of process parts required for forming toner images on the photoconductor belt 64 along the rotation direction of the photoconductor belt 64.

On the other hand, the intermediate transfer body 66 is surrounded by a transfer roller 67 of a process part required for forming toner images and transporting paper.

A transport passage for transporting paper is defined from a paper cassette 69 placed in a lower part of a main unit through the outside of the intermediate transfer body 66 to the top face of the main unit, and the transfer roller 67, a paper static eliminator (not shown), and a fuser 59 are placed along the transport passage.

Next, the operation of the embodiment of the record section 13 will be described as follows.

The photoconductor belt 64 and the intermediate transfer body 66 are rotated in a predetermined direction and the surface of the photoconductor belt 64 is charged to a predetermined potential by the charger 60. The charged surface of the photoconductor belt 64 is exposed to light by the exposure unit 62 that generates laser light corresponding to the image data. To expose the surface of the photoconductor belt 64 to light, first an image of one of four colors, for example, a yellow (Y) image is exposed to light and an electrostatic latent image corresponding to the yellow (Y) component is formed on the surface of the photoconductor belt 64. Then, the developing machine 63Y storing yellow (Y) toner corresponding to the electrostatic latent image on the photoconductor belt 64 is brought into contact with the photoconductor belt 64 to form a toner image, and the image formed on the photoconductor belt 64 is transferred to the intermediate transfer body 66.

Next, a toner image of the second color, for example, a magenta (M) image is formed on the photoconductor belt 64 and the intermediate transfer body 66 is rotated one revolution and then the M image is transferred onto the Y toner image of the first color reaching the contact part with the photoconductor belt 64. After this, the process is repeated for the third color, for example, cyan (C) and the fourth color, for example, black (K) to form an image with four color toners overlaid on the intermediate transfer body 66.

Last, the toner image formed on the intermediate transfer body 66 is transferred onto paper 68 fed from the paper cassette 69 by the transfer roller 67. Electricity is removed by the paper static eliminator (not shown) and the paper is output through the fuser 59 to the outside of the main unit.

In the embodiment, a reference patch is formed on the photoconductor belt 64 at a specific timing such as the engine starting time and the density of the formed patch is detected by an optical sensor 65. A detection signal is sent to the color image processing section 11B (described later) as a sensor signal 16.

Figure 9:
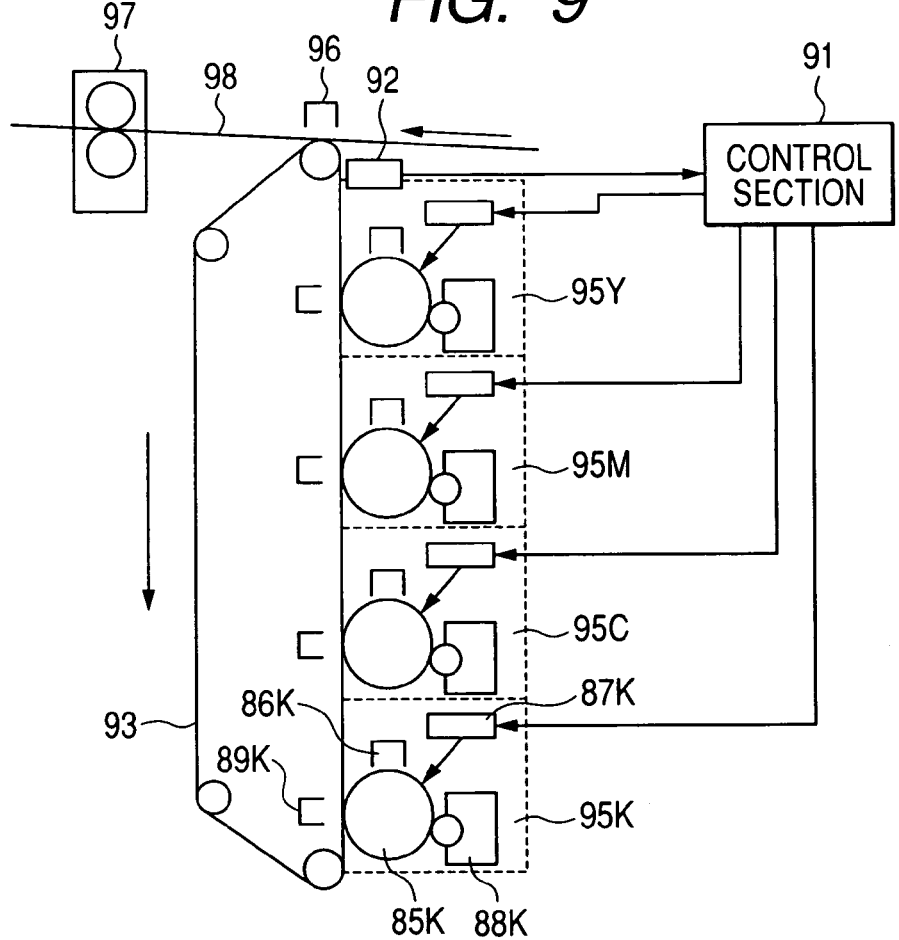
FIG. 9 is a schematic configuration drawing to show a record section according to a second embodiment of the invention.
Figure 10:
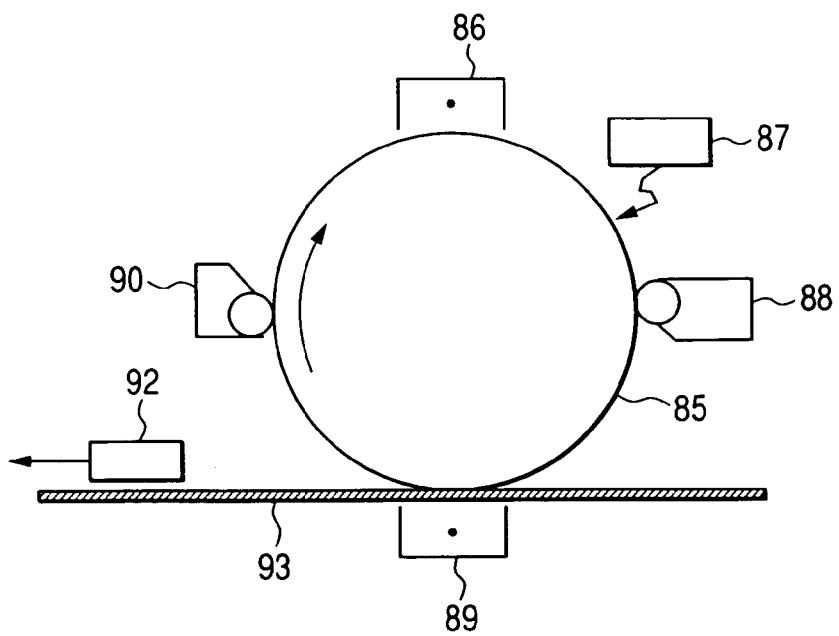
FIG. 10 is a schematic representation of an image formation unit in FIG. 9.

FIGS. 9 and 10 show the record section 13 according to another embodiment of the invention. The record section has four image formation units 95Y, 95M, 95C, and 95K placed in a longitudinal stack manner in the proximity of an intermediate recording medium 93. Each of the image formation units has a photoconductor drum 85, a charger 86, an exposure unit 87, a developing machine 88, a first transfer unit 89, and a cleaning unit 90, as shown in FIG. 10.

The photoconductor drum 85 provided by applying a coating of a photoconductor to the outer peripheral surface of an aluminum cylinder, etc., is driven in the arrow direction and the surface of the photoconductor drum 85 is uniformly charged to a predetermined potential.

When an image write signal is input to the exposure unit 87 from a control section 91, a laser is produced in response to the signal and light information corresponding to the image signal is applied to the surface of the photoconductor drum 85 for forming an electrostatic latent image. Further, when the photoconductor drum 85 proceeds in the arrow direction, the electrostatic latent image is developed by the developing machine 88 to form a toner visible image. The developed toner visible image is transferred onto the intermediate recording medium 93 by the first transfer unit 89 to which a predetermined bias voltage is applied. Next, the intermediate recording medium 93 onto which the toner image is transferred is transported by a transport unit and the toner image is transferred to record paper 98 by a second transfer unit 96 and then is fixed by the fuser 97 to form a permanent image.

Also in the embodiment, an optical sensor 92 is placed in the proximity of the intermediate recording medium 93 and a reference patch is formed on the intermediate recording medium 93 at the engine starting time, etc., and the density of the formed patch is detected by the optical sensor 92. A detection signal is sent to the control section 91 as a sensor signal 16.

4. Color Image Processing Section 11B

The color image processing section 11B in the color image processing apparatus 11 has a color correction unit 3, a four-color separation unit 5, a gray level correction unit 7, a gray level processing unit 9, and the parameter management unit 14. These units will be discussed below.

4.1 Color Correction Unit 3

The color correction unit 3 makes a color correction to RGB data (r, g, b) sent from the input buffer 2. For example, a multidimensional LUT (look-up table) for color correction is provided in the parameter management unit 14, and the color correction unit 3 loads the LUT (look-up table) and makes a color correction to the RGB data (r, g, b). The technique of the correction is already known and will not be discussed in detail.

4.2 Four-Color Separation Unit 5

Figure 2:
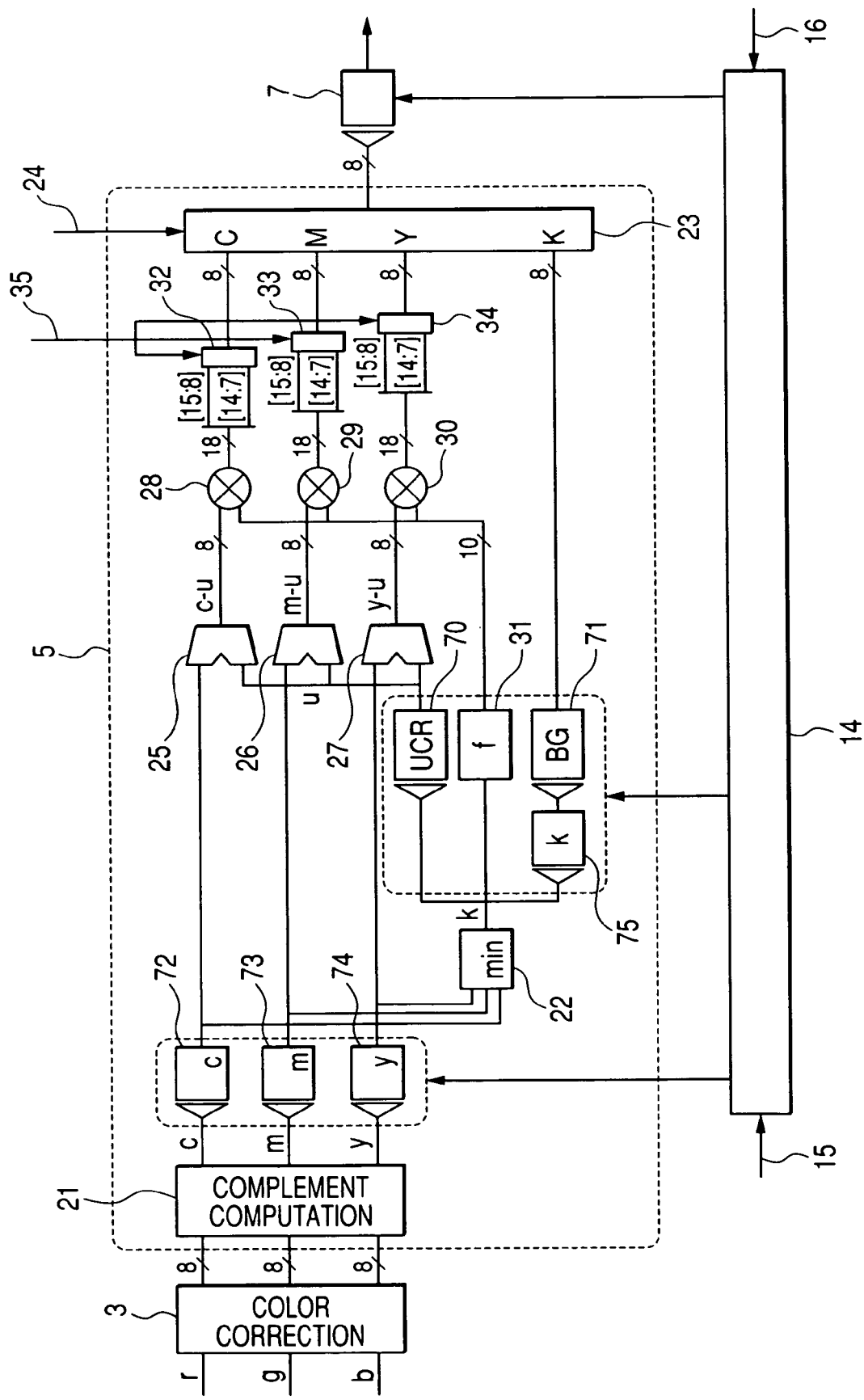
FIG. 2 is a schematic configuration drawing to show a four-color separation unit according to an embodiment of the invention.

The four-color separation unit 5 is a unit that generates four-color data of CMYK (c, m, y, k) from RGB data (r, g, b) and is mainly made up of a complement computation unit 21, a first gray level correction unit 72, 73, 74, and 75, a UCR calculation unit 70, a BG calculation unit 71, a correction coefficient generation unit 31, etc., as shown in FIG. 2.

a. Complement Computation Unit 21

The complement computation unit 21 is a unit that generates CMY (c0, m0, y0) from RGB data (r, g, b) subjected to color correction. In the embodiment, each piece (component) of the RGB data (r, g, b) consists of 8 bits. The data (c0, m0, y0) is found according to the following expression (2).

$$\left.\begin{array}{l} c0 = I\max - r \\ m0 = I\max - g \\ y0 = I\max - b \end{array}\right\} \quad (2)$$

where Imax denotes the maximum value represented by 8 bits, namely, 255. The computation in expression (2) can be executed by simple bit inversion. That is, the RGB data and the CMY data are equivalent data different only in logic (positive or negative) and explicit the complement computation unit 21 can be omitted simply by reversing the interpretation of 0, 1 signal. To simplify the description, the positive logic is applied throughout the Specification.

Imax=255 is for illustrative purpose only and if each piece (component) of the RGB data (r, g, b) is made up of 16 bits for advanced saturation computation, Imax=$2^{16}$=65535. Of course, the invention is not limited to the value of Imax.

b. First Gray Level Correction Unit 72, 73, and 74

Each of the first gray level correction unit 72, 73, and 74 performs gray level correction processing called γ correction to the input image data while referencing LUT (γc, γm, γy).

The parameter management unit 14 sets LUT (γc, γm, γy) in accordance with the additional information 15 previously added to the image data before one-page processing.

The additional information 15 is parameter added to the image data by the printer driver 18 through the user interface 19 and in the embodiment, is given as integer values (ic, im, iy, ik) in 21 steps of 0 to 20 (default 11) for each color.

According to the integer values, the parameter management unit 14 generates the LUT (γc, γm, γy) values based on the following relation, $$y = I\max\{1-(1-x/I\max)^{(1+(i-11)/10)}\} \quad (3)$$

where i is the corresponding value of ic, im, iy, or ik, x=0-255 is the input value referencing the table, and y is a table entry of the output value. As the LUT generation method, another method of providing 21 pieces of table data in external memory and selecting from among the 21 pieces of table data in accordance with the additional information 15 and setting the values in LUT (γc, γm, γy) is also available.

Here, data appearing in output of the first gray level correction unit 72, 73, and 74 after the three-color CMY data (c0, m0, y0) is subjected to γ correction is represented as (c1, m1, y1). The post-corrected data (c1, m1, y1) is added to a minimum value computation unit 22 for finding minimum value k0. k0 is represented by the following expression.

$$k0 = \min\{c1, m1, y1\} \quad (4)$$

c. UCR Calculation Unit 70, BG Calculation Unit 71, and Correction Coefficient Generation Unit 31

The UCR calculation unit 70 references a UCR table (simply UCR) using the minimum value k0 as an index and outputs a UCR value. Here, the value provided by referencing the table UCR using the minimum value k0 as an index is represented as u (k0).

Like the gray level correction unit 72, 73, 74, the first gray level correction unit 75 makes a γ correction to k0 and the resultant k0 value is added to the BG calculation unit 71. Letting output after the γ correction be γk (k0), the BG calculation unit 71 references a BG table (which will be hereinafter referred to as simply BG) using γk (k0) as an index and outputs a BG value k3.

To separate the function and simplify the description, the first gray level correction unit 75 and the BG calculation unit 71 are described separately; however, as the tables are previously combined, it is easy for the BG calculation unit 71 to also serve as the function of the first gray level correction unit 75.

The correction coefficient generation unit 31 generates a 10-bit correction coefficient value f (k0) for the 8-bit output value k0 of the minimum value computation unit 22.

Figure 11:
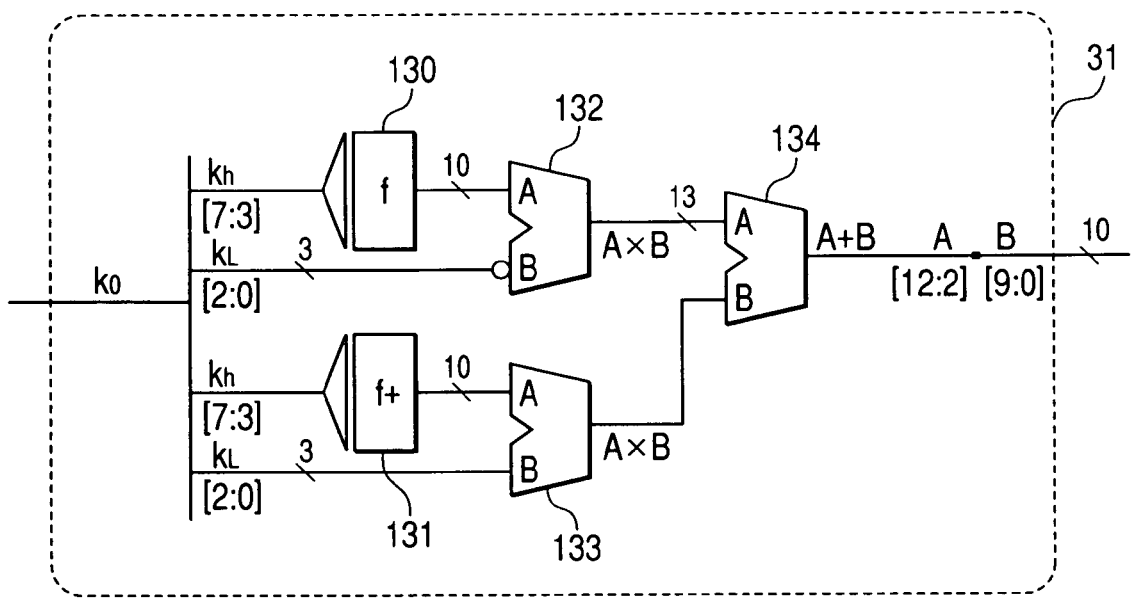
FIG. 11 is a schematic representation to show a configuration example of correction coefficient generation unit.
Figure 12:
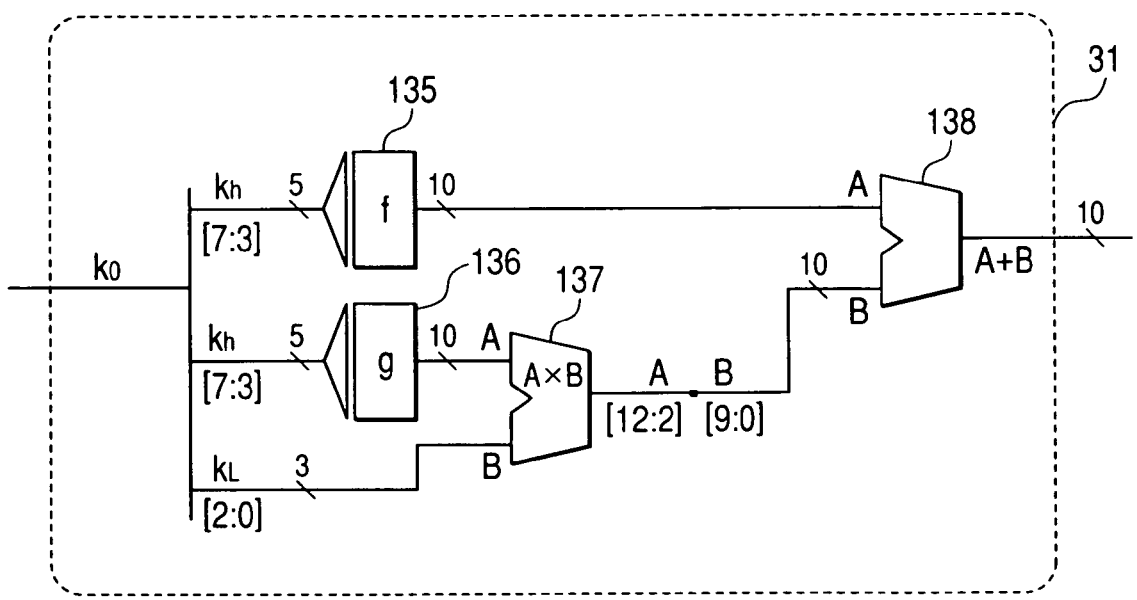
FIG. 12 is a schematic representation to show another configuration example of the correction coefficient generation unit.

To implement the correction coefficient generation unit 31, a method of using an LUT of 10-bit values directly corresponding to all values of 0 to 255 of the input value k0 or a method of generating f (k0) according to a representative value and interpolation operation as shown in FIG. 11 or 12 may be adopted. The latter method is effective for saving LUT memory. If the LUT is a small table, the rewrite time for rewriting the table contents is also shortened and thus the method is effective for speeding up the processing.

FIG. 11 shows a configuration example of the correction coefficient generation unit 31. Letting the high-order 5 bits of the input value k0 be kh and the low-order 3 bits be kL, kh is added to LUTs (look-up tables) 130 and 131. The LUTs 130 and 131 are referenced using kh as an index. The value of f (kh) is preset in the entry of the LUT 130 corresponding to kh and the value of f (kh+1) is preset in the entry of the LUT 131 corresponding to kh. In the figure, [7:3] means the 5 bits of bits 3 to 7 of bits 0 to 8 and [2:0] means the 3 bits of bits 0 to 2.

A multiplication unit 132 inputs the output value f (kh) of the LUT 130 and the value provided by inverting the kL value ($2^3$-kL) and outputs the product of the values, a 13-bit value.

On the other hand, a multiplication unit 133 inputs the output value f (kh+1) of the LUT 131 and kL and outputs the product of the values, a 13-bit value. An addition unit 134 outputs the sum of the multiplication unit 132 and 133 and the high-order 10 bits of the 13-bit output result is adopted as the output value of the correction coefficient generation unit 31. The output value of the correction coefficient generation unit 31 in FIG. 11 corresponds to the value y given according to the following expression:

$$y = \{(2^3 - kL) \cdot f(kh) + kL \cdot f(kh+1)\}/2^3 \quad (5)$$

(fractional portion is dropped)

FIG. 12 shows another configuration example of the correction coefficient generation unit 31. The high-order 3 bits of the input value k0, kh, is added to look-up tables 135 and 136. The value of f (kh) is set in the entry of the LUT 135 corresponding to kh and the value of f (kh+1)−f (kh) is set in the entry of the LUT 136 corresponding to kh.

A multiplication unit 137 outputs a 13-bit value resulting from multiplying the output value of the LUT 136 by kL and the high-order 10 bits of the output result are input to addition unit 138, which then adds the output value of the LUT 135 to the value of the high-order 10 bits and the addition result is adopted as the output value of the correction coefficient generation unit 31.

The output value of the correction coefficient generation unit 31 in FIG. 12 corresponds to the value y given according to the following expression.

$$y = f(kh) + \{f(kh+1) - f(kh)\} \cdot kL/2^3 \quad (6)$$

(fractional portion is dropped)

In this case, the value of the LUT 136 becomes negative; however, if f is sufficiently smooth, the difference value, g (kh)=f (kh+1)−f (kh) does not become a large absolute value and thus the number of the bits of the retained value can also be decreased for furthermore saving the memory in the range in which there is no problem if the LUT 136 is handled as a signed integer.

Comparing the configuration of the correction coefficient generation unit 31 as in FIG. 11 or 12 with the case where an 8-bit input, 10-bit output LUT is directly implemented, in the direct implementation, if data is retained with 10-bit output matched with 8-bit boundaries, 16 bits (2 bytes) become substantially necessary and thus 512 bytes become necessary; while, in the configuration in FIG. 11, 12, the two LUTs are paired to form 20-bit data and data is handled in 24-bit=3-byte units, so that it is made possible to implement with $3 \times 2^5 = 96$ bytes.

The composition method of the value of f (k0) implemented in the tables is described later.

d. Subtraction Unit 25, 26, and 27 and Multiplication Unit 28, 29, and 30

Output data of the first gray level correction unit 72, 73, 74 (c1, m1, y1) is added as one input of subtraction unit 25, 26, 27, and output u (k0) of the UCR calculation unit 70 is added as the other input. Therefore, output data of the subtraction unit 25, 26, 27 (c2, m2, y2) is represented by the following expression (7).

$$\left.\begin{aligned} c2 &= c1 - u(k0) \\ m2 &= m1 - u(k0) \\ y2 &= y1 - u(k0) \end{aligned}\right\} \quad (7)$$

Output of the subtraction unit 25, 26, 27 (c2, m2, y2) is added to multiplication unit 28, 29, 30, and 10-bit output f (k0) of the correction coefficient generation unit 31 is added as the other input. Therefore, output data of the multiplication unit 28, 29, 30 (c3, m3, y3) is represented by the following expression (8):

$$\left.\begin{aligned} c3 &= f(k0) \cdot c2 \\ m3 &= f(k0) \cdot m2 \\ y3 &= f(k0) \cdot y2 \end{aligned}\right\} \quad (8)$$

e. Effective Bit Selection Unit

In the embodiment, the output of the subtraction unit 25, 26, 27 is 8 bits and the output of the correction coefficient generation unit 31 is 10 bits. At this time, the computation result of expression (8) becomes 18 bits. To implement the second gray level correction unit 7 as a one-dimensional LUT, whenever the input range increases one bit, the necessary number of table entries becomes double and therefore it becomes necessary to set the input range to the minimum necessary number of bits to save memory.

Generally, if there is no loss of resolution caused by gray level correction, it is considered that 8 bits are necessary and sufficient for continuous tone representation and therefore it is considered that the optimum input range of the second gray level correction unit 7 for the purpose of linearizing the print density (more precisely, linearizing with respect to the color material amount (toner amount) to print) as described later is 8 bits.

Thus, according to a selection signal 35, effective bit selection unit 32, 33, 34 selects intermediate 8 bits of the 18-bit multiplication result of the multiplication unit 28, 29, 30 with the low-order 8 bits and the high-order 2 bits discarded (in FIG. 2, [15:8] means the selected signal range) if the selection signal 35 is 0, and selects intermediate 8 bits with the low-order 7 bits and the high-order 3 bits discarded ([14:7]) if the selection signal 35 is 1.

Such switching is performed, whereby if 0 is specified in the selection signal 35, the correction coefficient f (k0) in expression (8) acts on the output value of the subtraction unit 25, 26, 27 (c2, m2, y2) as a fixed point number of resolution with 2 bits to the left of the decimal point and 8 bits to the right of the decimal point (0 to 3+254/255); if 1 is specified in the selection signal 35, the correction coefficient f (k0) acts on (c2, m2, y2) as a fixed point number of resolution with 3 bits to the left of the decimal point and 7 bits to the right of the decimal point (0 to 7+127/128).

However, the high-order bits are also discarded in the effective bit selection unit 32, 33, 34 and thus the output is clipped to the 8-bit range of 0 to 255; in this point, the value range of f (k0) is limited so that the multiplication result does not exceed 255 as described later as the f (k0) composition method and therefore no problem arises.

Accordingly, as implementation of f (k0), processing of assigning priority to the resolution and accurately making a narrow-range correction and processing of slightly sacrificing the resolution and making a correction adaptable to a wider range are made compatible with each other with the same (10-bit) bit width by switching the selection signal 35; it is made possible to enlarge the range of f (k0) responsive to the purpose while saving the logic scale.

Particularly, to make the correction coefficient f (k0) act mainly for the purpose of reducing the value of (c2, m2, y2) (f (k0)<1 is main), the value 0 is specified in the selection signal 35; to make the correction coefficient f (k0) act for the purpose of enlarging the value of (c2, m2, y2) (f (k0)>1 is main), the value 1 is specified in the selection signal 35, whereby the optimum correction can be made.

f. Selection Unit 23

The output data of the multiplication unit 28, 29, 30 (c3, m3, y3) and output data k3 of the BG calculation unit 71 are added to selection unit 23. The selection unit 23 selects one of four pieces of input data in response to a selection signal 24 sent from a control section (not shown) and sends the selected input data to the second gray level correction unit 7 at the following stage. The selection signal 24 is a signal switched in synchronization with a vertical synchronizing signal of the printer for selecting a color signal responsive to the output color at the time as output from among four color data pieces (k3, c3, m3, y3).

4.3 Second Gray Level Correction Unit 7 and Gray Level Processing Unit 9

Figure 3:
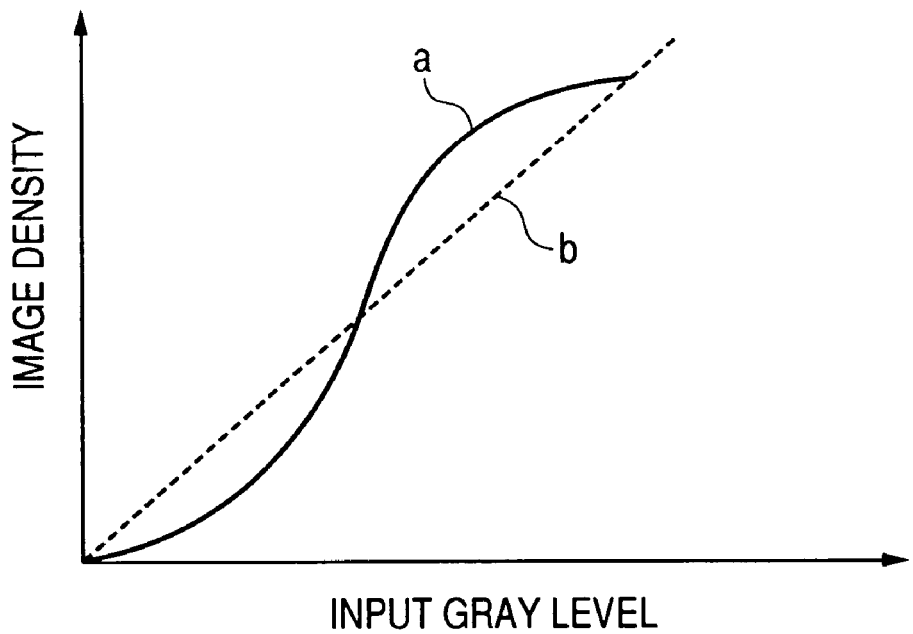
FIG. 3 is a schematic representation of gray level correction according to an embodiment of the invention.

The second gray level correction unit 7 calibrates the non-linear gray level characteristic determined by the characteristic of the record section 13 and the gray level processing method of the gray level processing unit 9 as shown in a in FIG. 3, for example, as an almost linear characteristic as in b in FIG. 3 and particularly makes a correction so that the relationship between the input image data (k3, c3, m3, y3) and the toner deposition amount of the output image becomes almost linear.

Although the output value of the second gray level correction unit 7 is usually 8 bits, it is also effective to relate an output value exceeding 8 bits to a strongly nonlinear characteristic like the characteristic in a in FIG. 3 to compensate for the gradation impaired by correction.

To handle the colors of CMYK switched by the selection unit 23, look-up tables γc', γm', γy', γk' for correction are provided in the parameter management unit 14, and the second gray level correction unit 7 previously loads the look-up table according to the selection signal 24 and then makes a correction to the input data while referencing the tables.

The gray level processing unit 9 performs processing of relating the output value of the second gray level correction unit 7 to an ON/OFF pulse that can be output in the record section 13, and sends the output signal to the control section 91 of the record section 13.

Next, the correction coefficient f (k0) generation method of the correction coefficient generation unit 31 will be discussed in detail.

4.4 Correction Coefficient f (k0) Generation Method

If "0" is selected as the selection signal 35 in FIG. 2, the 10-bit correction coefficient value f (k0) is generated as a value selected from among 0 to 3+255/256≈3.996 in 1/256 steps and acts on the output value of the subtraction unit 25, 26, 27 (c2, m2, y2) as previously described. If "1" is selected as the selection signal 35 in FIG. 2, f (k0) is generated as a value selected from among 0 to 7+127/128% 7.99 in 1/128 steps and acts on the output value of the subtraction unit 25, 26, 27 (c2, m2, y2) as previously described.

In the description to follow, it is assumed that any range mentioned above is selected as the f (k0) range and the multiplication result based on f (k0) is stored in the output range of 0 to Imax=255 by extraction of intermediate 8 bits described above. In the description to follow, it is assumed that the input/output range is unified to 0 to Imax.

At this time, the conditions required for the correction coefficient f (k0) become the following three conditions for (c3, m3, y3, k3):

Condition 1: f (k0) does not exceed a magnification upper limit value Amax.

Condition 2: The output range of (c3, m3, y3) does not exceed the maximum value Imax.

Condition 3: The total of (c3, m3, y3, k3) does not exceed a total toner limit value Tmax.

The magnification upper limit Amax in condition 1 is a constant such that Amax<1023/128≈77.99 from the assumption concerning the interpretation of f (k0) mentioned above.

As for condition 2, for example, for c3

$$c3 = f(k0) \cdot c2 \leq f(k0)(I\max - u(k0)) \leq I\max \qquad (9)$$

Therefore, $$f(k0) \leq \frac{I\max}{I\max - u(k0)} \qquad (10)$$

condition 2 is represented as above.

Likewise, as for condition 3, assuming that the output data of (c3, m3, y3, k3) of the four-color separation unit 5 is calibrated so as to become proportional to the toner amount according to the gray level correction table γ in the second gray level correction unit 7, the case where two colors of c1, m1, and y1 are Imax is considered, whereby the total toner limit value Tmax is represented by the following expression (11):

$$\begin{aligned} S &= (c3 + m3 + y3 + k3) \\ &= f(k0)(c2 + m2 + y2) + k3 \leq f(k0)(I\max - u(k0)) + \\ &\quad f(k0)(I\max - u(k0)) + f(k0)(k0 - u(k0)) + k3 \end{aligned} \qquad (11)$$

-continued
$$= f(k0)\{2(I\max - u(k0)) + (k0 - u(k0))\} + k3 \leq T\max$$

Therefore, $$f(k0) \leq \frac{T\max - k3}{2(I\max - u(k0) + k0 - u(k0))} \quad (12)$$

becomes the same value as condition 3.

Thus, when $$T(k0) = \frac{T\max - k3}{2(I\max - u(k0) + k0 - u(k0))} \quad (13)$$

is set, condition 3 becomes expression (16). Condition 1 is represented as expression (14) and condition 2 is represented as expression (15).

$$f(k0) \leq A\max \quad (14)$$

$$f(k0) \leq \frac{I\max}{I\max - u(k0)} \quad (15)$$

$$F(k0) \leq T(k0) \quad (16)$$

Hereinafter, expression (14) will be referred to as the maximum magnification condition, expression (15) as the output range condition, and expression (16) as the maximum toner amount condition.

The maximum magnification condition (14) is a condition required when extreme under color removal with the under color removal ratio u (k0)/Imax reaching about 90% or more is executed Usually, the output range condition (15) becomes the sufficient condition of the maximum magnification condition (14).

In fact, the relation between the right sides of the conditions (14) and (15) becomes $$A\max \leq \frac{I\max}{I\max - u(k0)} \quad (17)$$

when the under color removal ratio is $$\frac{u(k0)}{I\max} \geq 1 - \frac{1}{A\max} \quad (18)$$

For example, if Amax=15, the right side of expression (18) is about 0.93 and therefore if the under color removal ratio does not exceed 93%, the maximum magnification condition (14) is automatically satisfied according to the output range condition (15).

Since f (k0) needs to satisfy all of the maximum magnification condition (14), the output range condition (15), and the maximum toner amount condition (16), f (k0) is found according to the following expression (19):

$$f(k0) = \left\{A\max, \frac{I\max}{I\max - u(k0)}, T(k0)\right\} \quad (19)$$

$$(k0 = 0, 1, 2, \ldots, I\max)$$

Next, specific examples of the BG table value BG (k0), the UCR table value u (k0), and the correction coefficient table value f (k0) are shown.

Figure 4:
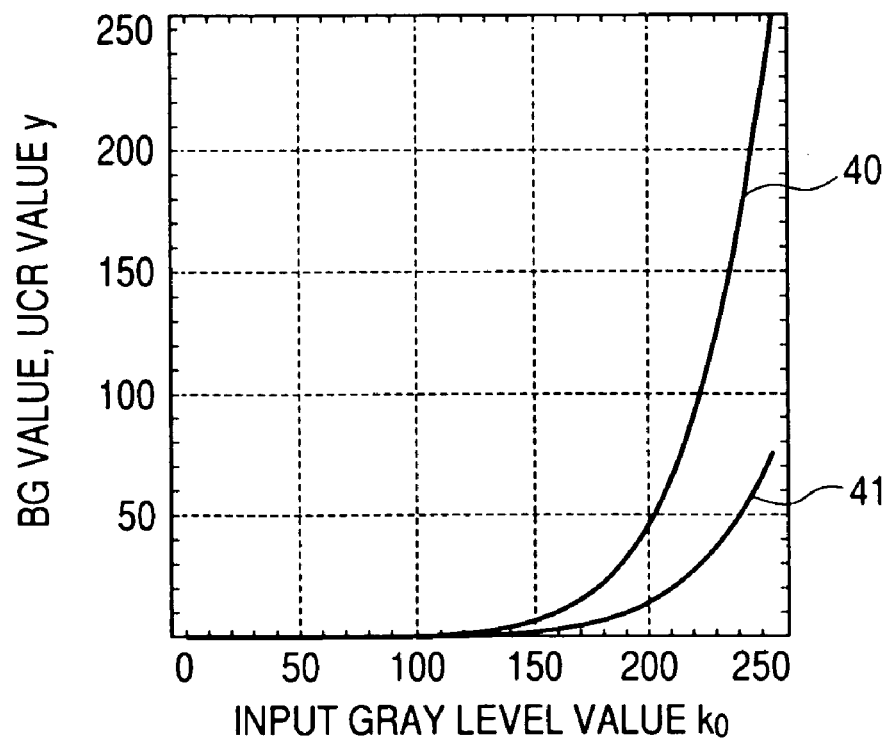
FIG. 4 is a characteristic drawing of input gray level value k0 vs. BG value and UCR value according to an embodiment of the invention.
Figure 5:
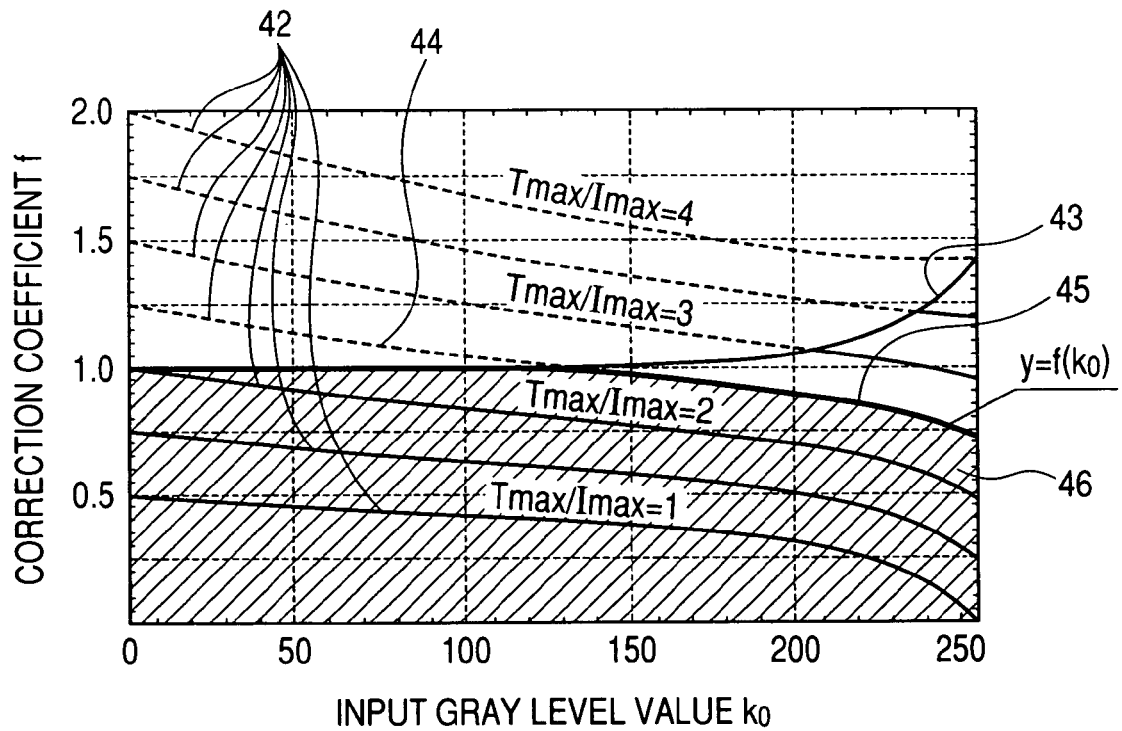
FIG. 5 is a characteristic drawing of input gray level value k0 vs. correction coefficient f (k0) according to an embodiment of the invention.

FIG. 4 is a graph to show examples of the BG table value BG (k0) (=k3) and the UCR table value u (k0). The horizontal axis indicates the input gray level value k0 and the vertical axis indicates the output gray level value y. Curves 40 and 41 correspond to y=BG (k0) and y=u (k0) respectively. FIG. 5 shows an example of the correction coefficient table value f (k0) obtained according to expression (19) relative to the BG table value BG (k0) and the UCR table value u (k0).

A curve group 42 in FIG. 5 is a graph of y=f (k0) when the maximum toner amount limit Tmax in 0.5 steps of 1.0 to 4.0 as the ratio of Tmax to Imax (Tmax/Imax). Particularly, a curve 44 represents a graph of y=f (k0) when the maximum toner amount limit is set to 250% of Imax, namely, Tmax/Imax=2.5. A curve 43 is a graph of y=Imax/(Imax−u (k0)).

Therefore, a common area 46 below the curves 43 and 44 becomes an area satisfying the conditions (14) to (16) under the limitation of the maximum toner amount 250% in BG and UCR setting in FIG. 4. A thick line 45 of the upper limit of the common area 46 represents the curve y=f (k0) obtained according to expression (19) at this time.

In this example, if the maximum toner amount limit Tmax slightly changes, f (k0) acts mostly as a value of f (k0)<1. Thus, if "0" is specified as the selection signal 35 in FIG. 2 and f (k0) is set to a value selected in the range of 0 to 3+255/256≈3.996 in 1/256 steps and is made to act on the output value of the subtraction unit 25, 26, 27 (c2, m2, y2), the setting becomes the optimum setting for making the range of f (k0) and the resolution compatible with each other.

Of course, the conditions (14) to (16) would be satisfied in a hatched area 46 below the curve 45 and thus g (k0) such that g (k0)≦f (k0) may be adopted as the value of the correction coefficient table of the correction coefficient generation unit 31. However, f (k0) is the best solution for making possible the widest color reproduction in the sense of giving the maximum value of the area 46.

Figure 6:
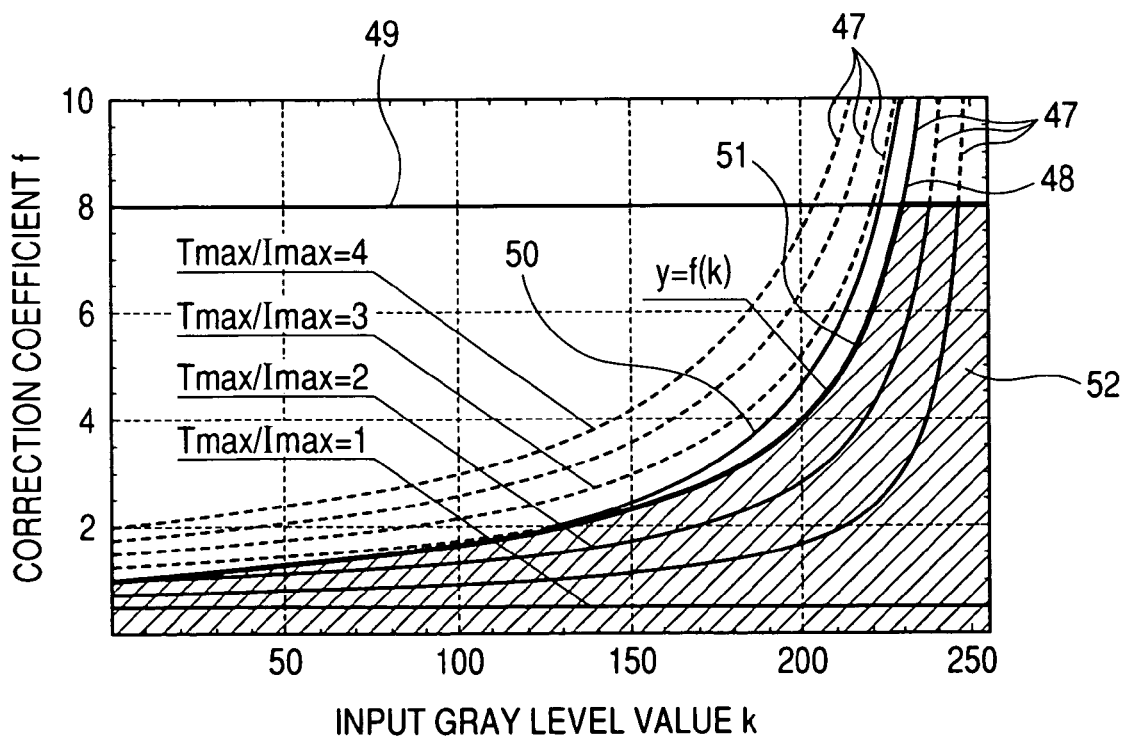
FIG. 6 is a characteristic drawing of input gray level value k0 vs. correction coefficient f (k0) according to an embodiment of the invention.

Next, FIG. 6 shows an example wherein the BG table value BG (k0) and the UCR table value u (k0) are set to BG (k0)=u (k0)=k0. A curve group 47 in FIG. 6 is a graph of y=f (k0) when Tmax/Imax is in 0.5 steps of 1.0 to 4.0, and a curve 48 particularly represents a graph of y=f (k0) when Tmax/Imax=2.5. A line 49 is y=Amax when the magnification upper limit Amax=8, and a curve 50 represents the output range limitation $$y = \frac{I\max}{I\max - k0} \quad (20)$$

Therefore, a common area 52 hatched below the curves and line 48, 49, and 50 represents an area satisfying the conditions (14) to (16) in 100% UCR under the condition of the magnification upper limit 8X and the maximum toner amount 250%. Particularly, a thick line 51 of the upper limit of the common area 52 corresponds to y=f (k0) obtained according to expression (19).

In this example, f (k0) acts mostly as a value of 1 to 8 and thus if "1" is specified as the selection signal 35 in FIG. 2 and f (k0) is set to a value selected in the range of 0 to 7+127/128≈7.99 in 1/128 steps and is made to act on the output value of the subtraction unit 25, 26, 27 (c2, m2, y2), it is suited for making the range of f (k0) and the resolution compatible with each other (7+127/128 is used as f (k0)=8).

As described above, the correction coefficient table value f (k0) is generated according to expression (19) in response to the BG table value BG (k0) and the UCR table value u (k0), four-color separation not exceeding the maximum toner amount Tmax is made possible. However, the BG table value BG (k0) depends on the gray level correction table γk of the first gray level correction unit 75 and therefore whenever the density adjustment command value for black is changed in the additional information 15, it becomes necessary for the parameter management unit 14 to again generate the correction coefficient table value f (k0) and again load the value into the correction coefficient table of the correction coefficient generation unit 31.

This leads to the following problem: In a printer system shared between or among computers, the adjustment of the first gray level correction unit made according to the favorite of each user becomes the setting in the side (printer side) close to the record section 13 shared among the users and thus if print jobs of the users are involved, the loads on the BG calculation unit 71, the UCR calculation unit 70, the correction coefficient generation unit 31, etc., for table calculation and reloading involved in reconstruction of LUT increase.

Figure 13:
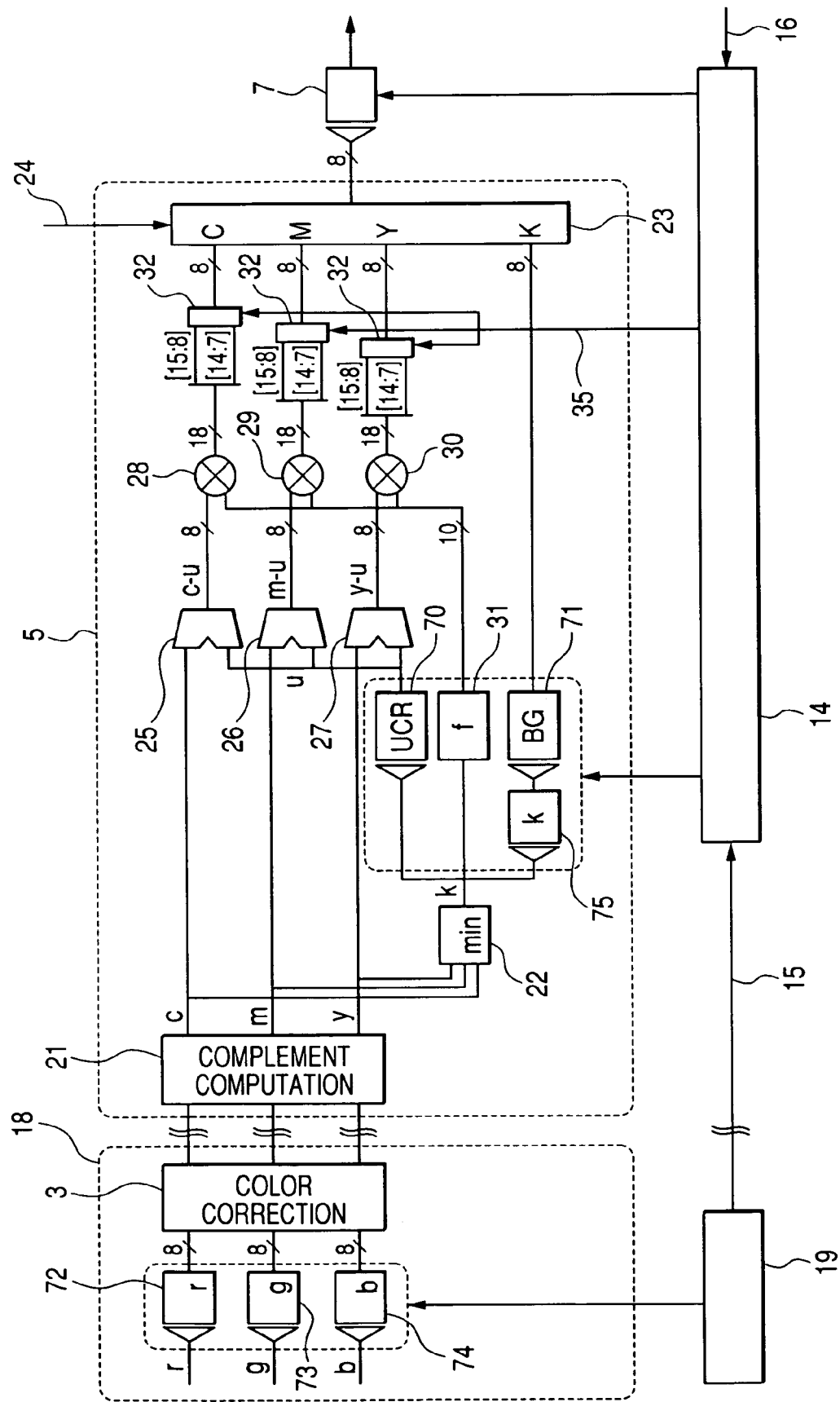
FIG. 13 is a schematic configuration drawing to show an image processing section in a printer system according to an embodiment of the invention.

To circumvent this problem, another embodiment of the invention shown in FIG. 13 is an example wherein the color correction unit 3 and the first gray level correction unit 72, 73, and 74 are removed from the color image processing section 11B of the printer and are implemented in the printer driver 18 as software processing.

In the embodiment, the first gray level correction unit 72, 73, and 74 are placed preceding the color correction unit 3. RGB input value r, g, b is subjected to gray level correction in response to the value set through the user interface 19. In this case, as combined with a user interface as gray level correction to the input RGB value, the user interface free of a sense of being out of place for abolishing density adjustment to K is constructed. If the density adjustment to K in the user interface 19 is abolished, the first gray level correction unit 75 for K can also be abolished.

In this case, the BG table value BG (k0), the UCR table value u (k0), and the correction coefficient table value f (k0) can be previously determined independently of the user setting for the user interface 19, so that it is made possible to circumvent the problem described above.

Figure 14:
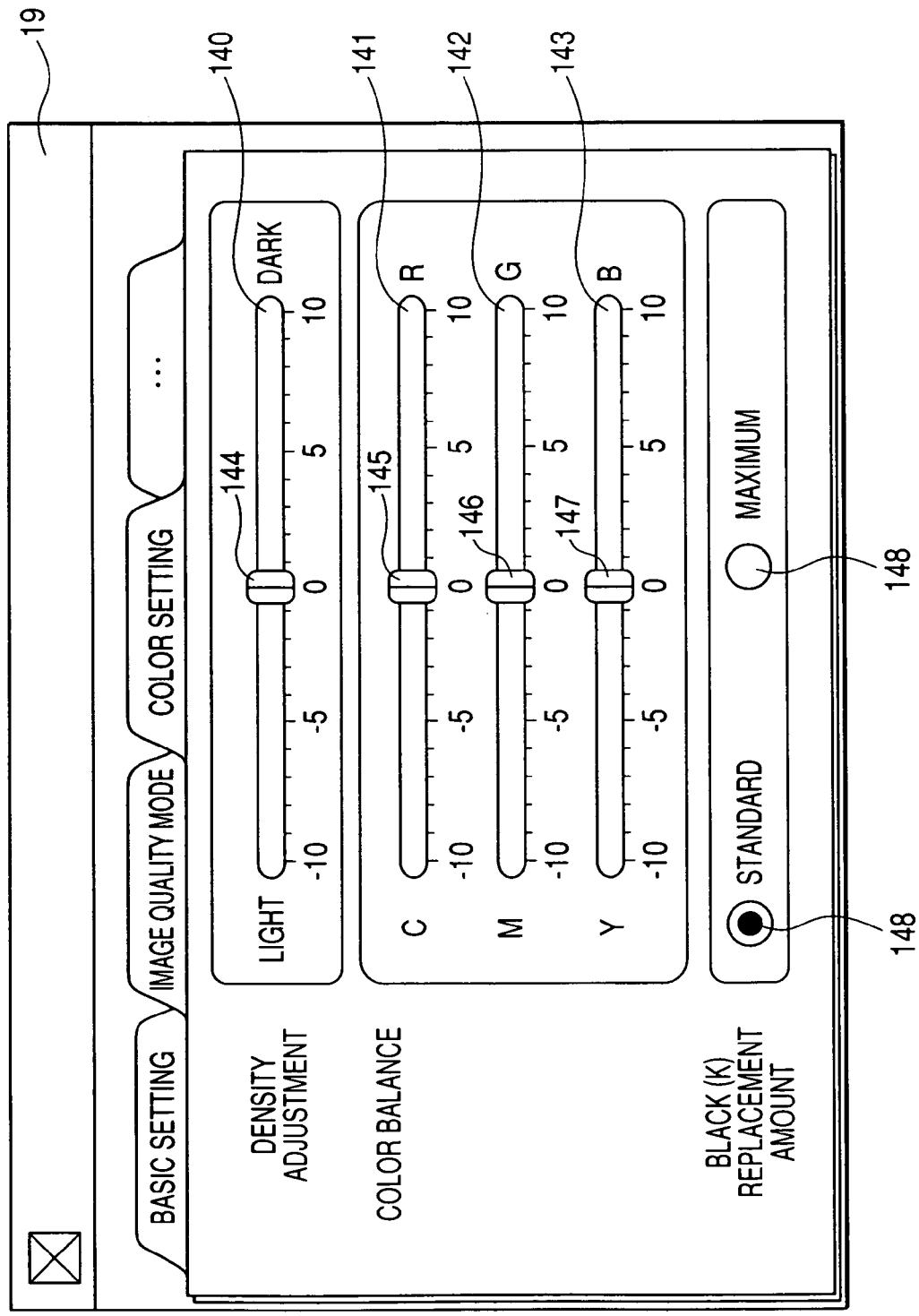
FIG. 14 is a schematic representation of a density adjustment user interface corresponding to the system in FIG. 13.

FIG. 14 shows an example of the user interface 19 corresponding to the example in FIG. 13. User's density adjustment is covered by a density adjustment slider 140 as a representative. If the user selects one of integer values in 21 steps of −10 to 10 as a setup value i with a marker 144 of the density adjustment slider 140, according to the relation $$y = I\max\{(x/I\max)^{(1+(i/20))}\} \quad (21)$$

the first gray level correction unit 72, 73, and 74 generate LUTs and convert all values of RGB input value (r, g, b) all together, whereby light and shade of the whole image are converted. If a density adjustment slider 141 for R is set, conversion of expression (21) for the setup value with a marker 145 as well as the expression of the input/output relation based on the density adjustment slider 140 setting is executed for the LUT of the first gray level correction unit 72, whereby the color balance concerning R is corrected. In this case, if the user sets the marker 145 to the "+" side, redness is increased and if the user sets the marker 145 to the "−" side, redness is decreased, whereby the density feeling of cyan of a complementary color is strengthened. The same thing can be said for the operation of density adjustment sliders 142 and 143 and markers 146 and 147 for other colors.

In the example of the user interface 19 in FIG. 14, a radio button 148 for the user to specify switching of the black (K) replacement amount is provided, enabling the user to select STANDARD or MAXIMUM exclusively.

In the embodiment in FIG. 13, as sets of the BG table value, the UCR table value, and the correction coefficient table value, a "standard setting" set made up of the BG and UCR table values shown in FIG. 4 and the correction coefficient table value indicated by the curve 45 in FIG. 5 and a "100% UCR setting" set made up of the correction coefficient table values indicated by the curve 51 in FIG. 6 as BG (k0)=u (k0)=k0 are previously retained in the parameter management unit 14.

If the user selects STANDARD with the radio button 148 of the user interface 19, the table values in the "standard setting" set are set in the LUTs of the BG calculation unit 71, the UCR calculation unit 70, and correction coefficient generation unit 31 in FIG. 13, and 0 is set in the value of a selection signal 35.

Likewise, if the user selects MAXIMUM with the radio button 148 of the user interface 19, the table values in the "100% UCR setting" set are set in the LUTs of the BG calculation unit 71, the UCR calculation unit 70, and the correction coefficient generation unit 31 in FIG. 13, and 1 is set in the value of the selection signal 35. These settings are changed all at once by the parameter management unit 14 based on the additional information 15 added to image data through the user interface 19.

If the user interface in FIG. 14 is not provided with the user interface for the user to enter a switching command of the black (K) replacement amount (in this case, the radio button 148), the adjustment of the first gray level correction unit made according to the favorite of each user is completely closed in the adjustment of the computer of the user, so that occurrence of the load of again generating the table caused by the user adjustment is completely prevented.

However, if the user interface for the user to enter a switching command of the black (K) replacement amount is simply provided as described above, the table generation calculation each time user adjustment is made can be made unnecessary by providing all required table sets.

Particularly, in the "100% UCR setting," switching unit for allowing processing to pass through is implemented for the UCR calculation unit 70 and the BG calculation unit 71, whereby table loading can be passed and thus the table loading burden caused by switching becomes substantially only the table setting for the correction coefficient generation unit 31.

Further, the correction coefficient generation unit 31 is implemented by the interpolation method capable of saving the table data amount as described above, so that the decrease effect of the table switching load close to the case where the black (K) replacement amount is not switched can be provided.

5. Image Processing Method

Next, one embodiment of an image processing method of the invention will be discussed with a flowchart of FIG. 15. First, at step 100, the additional information 15 added to image data is read. At step 101, the gray level correction tables γc, γm, γy, and γk in the first gray level correction unit 72, 73, 74, and 75 are initialized based on the additional information 15. Likewise, at step 102, sensor information 16 concerning the toner deposition amount from the printer engine 13 is read and at step 103, the gray level correction tables γc', γm', γy', and γk' in the second gray level correction unit 7 are initialized based on the sensor information 16.

To initialize the gray level correction tables of the first gray level correction unit 72, 73, 74, and 75 and the second gray level correction unit 7, tables are selected from among the gray level correction tables provided in the parameter management unit 14 according to the additional information 15 or the sensor information 16 and are loaded.

Next, at step 104, the table UCR in the UCR calculation unit 70, the table BG in the BG calculation unit 71, and the table f in the correction coefficient generation unit 31 are initialized.

Further, at step 105, the first pixel data (r, g, b) is input. At step 106, complement data (c0, m0, y0) of the data (r, g, b) is calculated according to expression (3) and then the gray level correction tables γc, γm, and γy in the first gray level correction unit 72, 73, and 74 are referenced using (c0, m0, y0) as an index, whereby data subjected to gray level correction (c1, m1, y1) is obtained. c1, m1, and y1 are represented by expression (22):

$$\left. \begin{array}{l} c1 = \gamma c\,(I\max - r) \\ m1 = \gamma m\,(I\max - g) \\ y1 = \gamma y\,(I\max - b) \end{array} \right\} \quad (22)$$

The minimum value computation unit 22 calculates minimum value k0 of c1, m1, y1. That is k0=min{c1, m1, y1}.

At step 107, the table UCR of the UCR calculation unit 70 is referenced using k0 as an index and u (k0) is obtained. The table BG of the BG calculation unit 71 is referenced and BG (k0) is obtained. The table f of the correction coefficient generation unit 31 is referenced and f (k0) is obtained.

At step 108, c3, m3, and y3 are calculated according to expressions (7) and (8). At step 109, the gray level correction tables γc', γm', γy', and γk' in the second gray level correction unit 7 are referenced using (c3, m3, k3) as an index, whereby (c4, m4, y4, k4) is acquired and at step 110, is output. At step 111, whether or not processing for all pixels of one page is complete is determined. If the processing is not complete, the process returns to step 105 and the processing is repeated.

Figure 15:
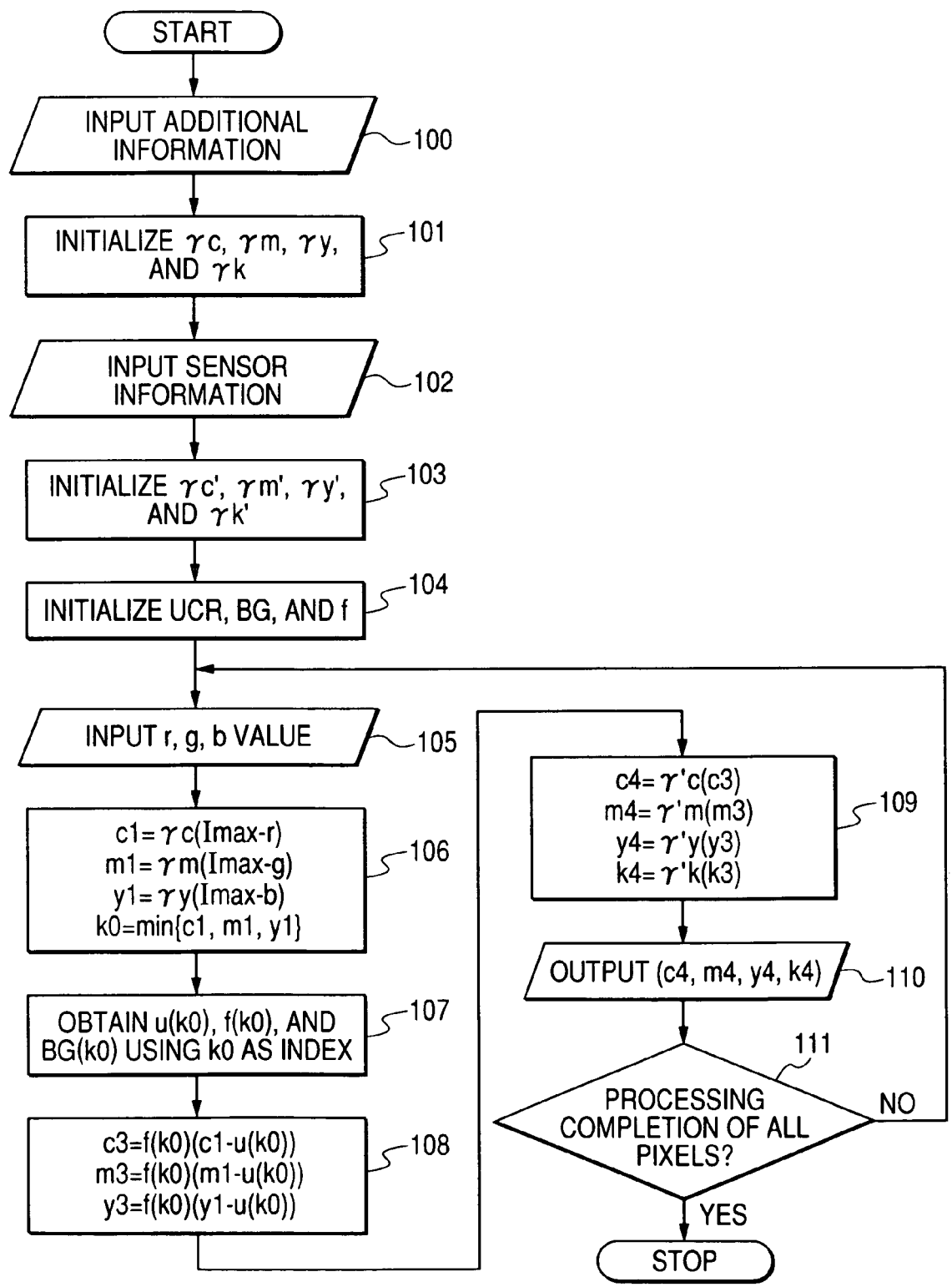
FIG. 15 is a flowchart to show a color image processing method according to an embodiment of the invention.
Figure 16:
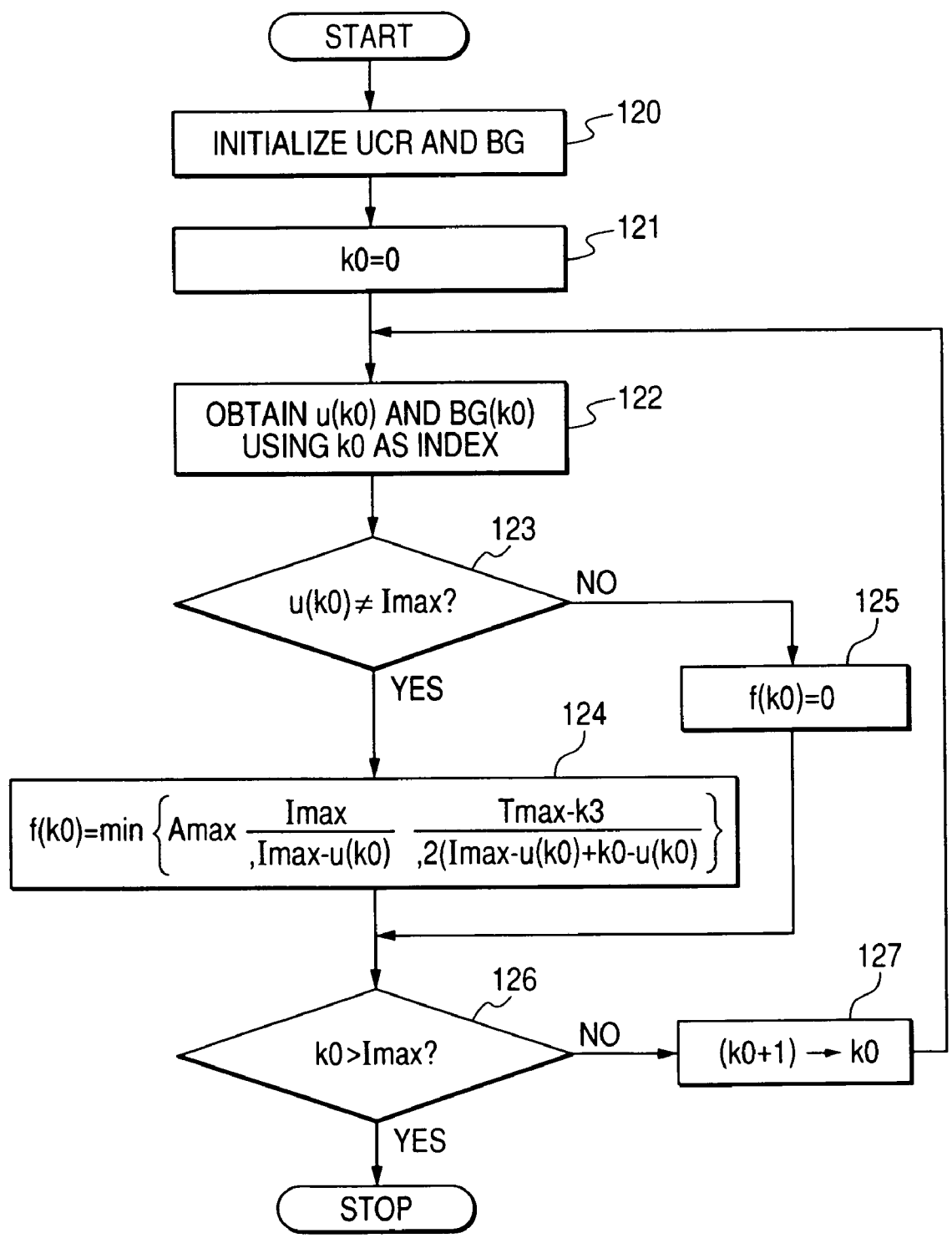
FIG. 16 is a flowchart to show details of one step in FIG. 15.

FIG. 16 shows details of step 104 in FIG. 15. First, at step 120, the table UCR of the UCR calculation unit 70 and the table BG of the BG calculation unit 71 are initialized. To initialize the tables UCR and BG, they are loaded from a look-up table provided in the parameter management unit 14 as fixed values.

At step 121, index k0 is initialized to k0=0. At step 122, the tables UCR and BG are referenced using k0 as an index and u (k0) and BG (k0) are obtained from the UCR calculation unit 70 and the BG calculation unit 71. However, for the convenience of the description, γk (k0)=k0 and BG (k0)=k3.

At step 123, a comparison is made between u (k0) and Imax and if u (k0)≠Imax, the process goes to step 124. At step 124, the correction coefficient value f (k0) is calculated according to expression (17).

On the other hand, if u (k0)=Imax at step 123, the process goes to step 125 and f (k0) is set to 0.

At step 126, whether or not k0>Imax is determined. If NO is returned, the process goes to step 127, k0 is incremented by one, the process returns to step 122, and the above-described processing is repeated. When k0 becomes greater than Imax, the processing is terminated.

Although one embodiment of the invention has been described, various modifications can be easily made within the scope of the basic concept of the invention and these modifications are also contained in the invention, of course.

To use the configuration shown in FIG. 9 as the record section 13, the selection unit 23 in FIG. 9 becomes unnecessary and the output data of the multiplication unit 28, 29, and 30 and the BG calculation unit 71 (c3, m3, y3, k3) is added to the second gray level correction unit 7 and the output data of the second gray level correction unit 7 (c4, m4, y4, k4) is added to the C unit 95C, the M unit 95M, the Y unit 95Y, and the K unit 95K in FIG. 9.

The first gray level correction unit 72, 73, and 74 and the color correction unit 3 in FIG. 13 can also be implemented with the processing order intact at the preceding stage of the complement computation unit 21 in the four-color separation unit 5 as with the case in FIG. 2 rather than as the processing of the printer driver 18. In this case, the user interface shown in FIG. 14 can be used as the user interface 19 and in addition, the color correction unit 3 can be processed at high speed as hardware rather than software, but it becomes impossible to close the processing corresponding to the user adjustment in the computer.

The entire disclosure of Japanese Patent Application No. 2005-055326 filed on Mar. 1, 2005 and Japanese Patent Application No. 2005-339550 filed on Nov. 25, 2005 including specification, claims, drawings and abstract is incorporated herein be reference in its entirety.

What is claimed is:

1. A color image processing apparatus that generates output gray level values (c4, m4, y4, k4) of four colors including black from input gray level values (c1, m1, y1) of three colors of cyan, magenta and yellow, the color image processing apparatus comprising:
a minimum value selection unit that selects a minimum value k0 of the input gray level values (c1, m1, y1);
a first calculation unit that calculates a generation amount k3 of black based on the minimum value k0;
a second calculation unit that calculates an under color removal amount u (k0) which is a value relevant to the minimum value k0;
a third calculation unit that outputs a correction coefficient value f (k0) which is a value relevant to the minimum value k0;
a subtraction unit that subtracts the under color removal amount u (k0) from each of the input gray level values (c1, m1, y1) to generate output (c2, m2, y2);
a multiplication unit that multiplies the output of the subtraction unit (c2, m2, y2) by the correction coefficient value f (k0) to obtain output (c3, m3, y3);
a significant bit selection unit that selects a significant bit of a multiplication result of the multiplication unit; and
a gray level correction unit that makes a gray level correction to the generation amount k3 of black and the output of the multiplication unit (c3, m3, y3) to obtain the output gray level values (c4, m4, y4, k4).

2. The color image processing apparatus according to claim 1,
wherein an input/output relationship of at least one of the first, second and third calculation units, and an operation of the significant bit selection unit switches in conjunction with each other.

3. The color image processing apparatus according to claim 1,
wherein the third calculation unit includes a look-up table and an interpolation computation unit.

4. The color image processing apparatus according to claim 3,
wherein a range of an input value k0 of the third calculation unit is 8 bits, a range of an output value f(k0) of the third calculation unit is 10 bits or more, and a range of an output of the significant bit selection unit as an input to the gray level correction unit is 8 bits.

5. A color image processing apparatus for generating output gray level values (c4, m4, y4, k4) of four colors including black from input gray level values (c, m, y) of three colors of cyan, magenta and yellow, the color image processing apparatus comprising:
a first gray level correction unit that makes a gray level correction to the input gray level values (c, m, y);
a color correction unit that makes a color correction to output values of the first gray level correction unit (c0, m0, y0) to obtain output (c1, m1, y1);
a minimum value selection unit that selects a minimum value k0 of the output (c1, m1, y1);
a first calculation unit that calculates a generation amount k3 of black based on the minimum value k0;
a second calculation unit that calculates an under color removal amount u (k0) which is a value relevant to the minimum value k0;
a third calculation unit that outputs a correction coefficient value f (k0) which is a value relevant to the minimum value k0;
a subtraction unit that subtracts the under color removal amount u (k0) from the output (c1, m1, y1) to generate output (c2, m2, y2);
a multiplication unit that multiplies the output of the subtraction unit (c2, m2, y2) by the correction coefficient value f (k0);
a significant bit selection unit that selects a significant bit of a multiplication result of the multiplication unit;
a second gray level correction unit that makes a gray level correction to the generation amount k3 of black and an output of the multiplication unit (c3, m3, y3) to obtain output gray level values (c4, m4, y4, k4); and
a user interface that allows a user to enter density gray level adjustment parameters of cyan, magenta, yellow, and black;
wherein an input/output relationship of the first gray level correction unit switches in accordance with the gray level adjustment parameters of cyan, magenta, and yellow; and
wherein an input/output relationship of the first calculation unit switches in accordance with the gray level adjustment parameter of black.

6. A color printer system comprising:
a computer that creates and edits RGB image data described in three primary colors of red, green and blue;
an image processing section that processes the RGB image data; and
a record section that records a color image on a record medium based on the data processed by the image processing section,
wherein the image processing section comprises:
a minimum value selection unit that selects a minimum value k0 of complement data (c1, m1, y1) of the RGB image data;
a first calculation unit that calculates a generation amount k3 of black based on the minimum value k0;
a second calculation unit that calculates an under color removal amount u (k0) which is a value relevant to the minimum value k0;
a third calculation unit that outputs a correction coefficient value f (k0) which is a value relevant to the minimum value k0;
a subtraction unit that subtracts the under color removal amount u (k0) from the complement data (c1, m1, y1) to generate output (c2, m2, y2);
a multiplication unit that multiplies the output of the subtraction unit (c2, m2, y2) by the correction coefficient value f (k0);
a significant bit selection unit that selects a significant bit of a multiplication result of the multiplication unit; and
a gray level correction unit that makes a gray level correction to the generation amount k3 of black and an output of the multiplication unit (c3, m3, y3) to obtain output gray level values (c4, m4, y4, k4).

7. The color printer system according to claim 6,
wherein an input/output relationship of at least one of the first, the second, and the third calculation units, and an operation of the significant bit selection unit switches in conjunction with each other.

8. The color printer system according to claim 6,
wherein the third calculation unit includes a look-up table and an interpolation computation unit.

9. The color printer system according to claim 8,
wherein a range of an input value k0 of the third calculation unit is 8 bits, a range of an output value f (k0) of the third calculation unit is 10 bits or more, and a range of an output of the significant bit selection unit as an input to the gray level correction unit is 8 bits.

10. The color printer system according to claim 6, wherein the image processing section further comprises:
another gray level correction unit that makes a gray level correction to the RGB image data; and
a density adjustment user interface that allows a user to enter a density adjustment parameter of density or brightness of an input images,
wherein the input/output relationship of the another gray level correction unit switches in accordance with the density adjustment parameter.

11. The color printer system according to claim 10,
wherein the image processing section further comprises:
a driver section implemented as software in the computer, the driver section including the density adjustment user interface and the another gray level correction unit; and
a controller section which comprises hardware installed in a proximity of the record section, the controller section including the gray level correction unit.

12. The color printer system according to claim 11,
wherein a density adjustment parameter concerning black is added to image data transmitted from the driver section of the image processing section to the controller section.

* * * * *